Dec. 17, 1957     E. S. DE HART ET AL     2,816,606
TIRE TREAD CUTTING MACHINE

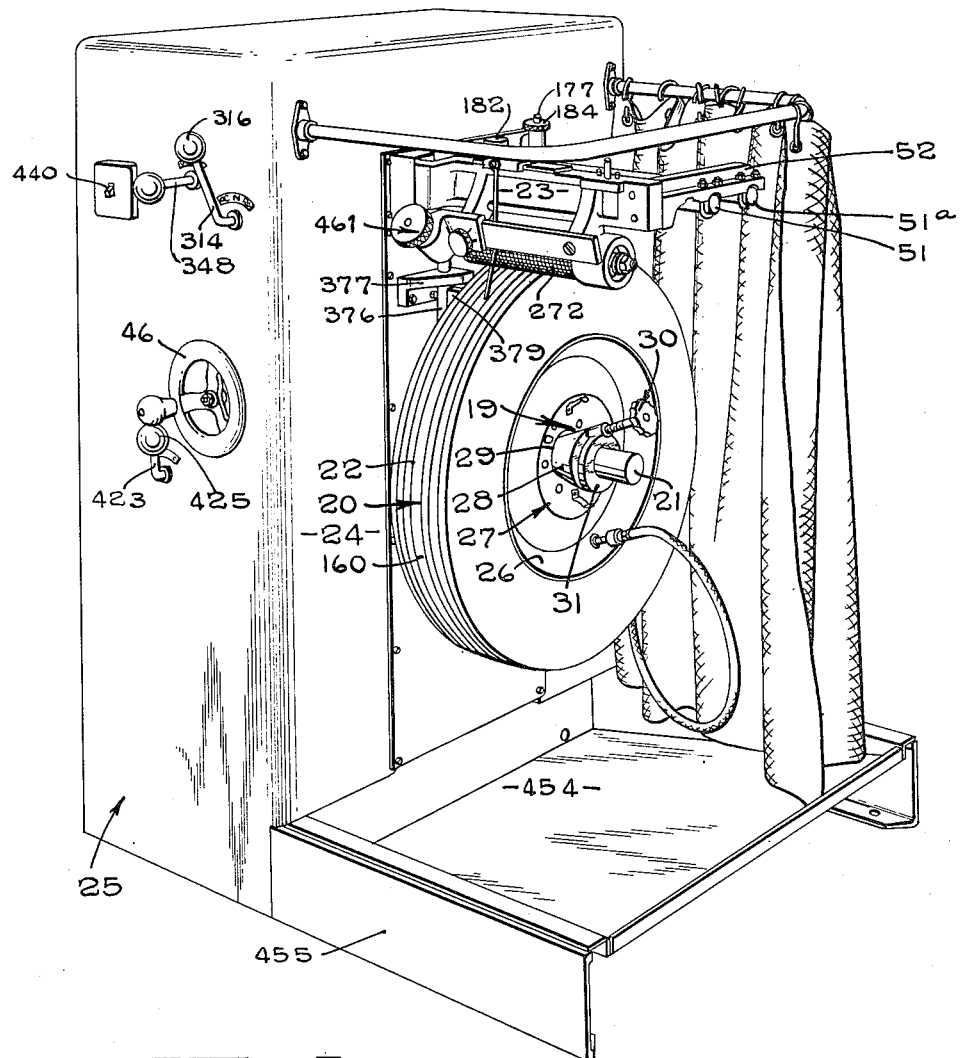
FIG_1
INVENTORS
EDWARD S. DE HART
JESS L. ELAM
BY Hans G. Hoffmeister.
ATTORNEY

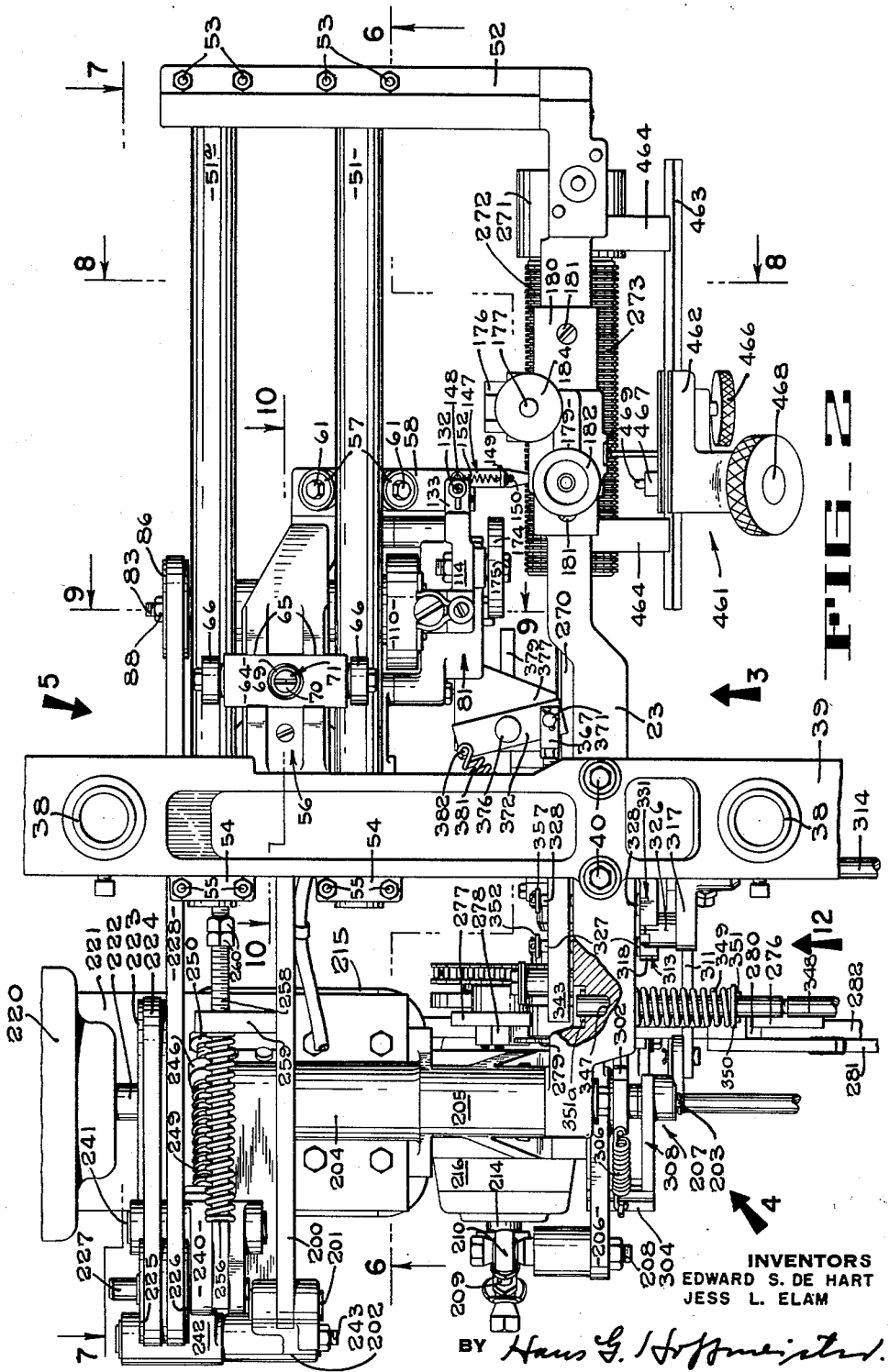

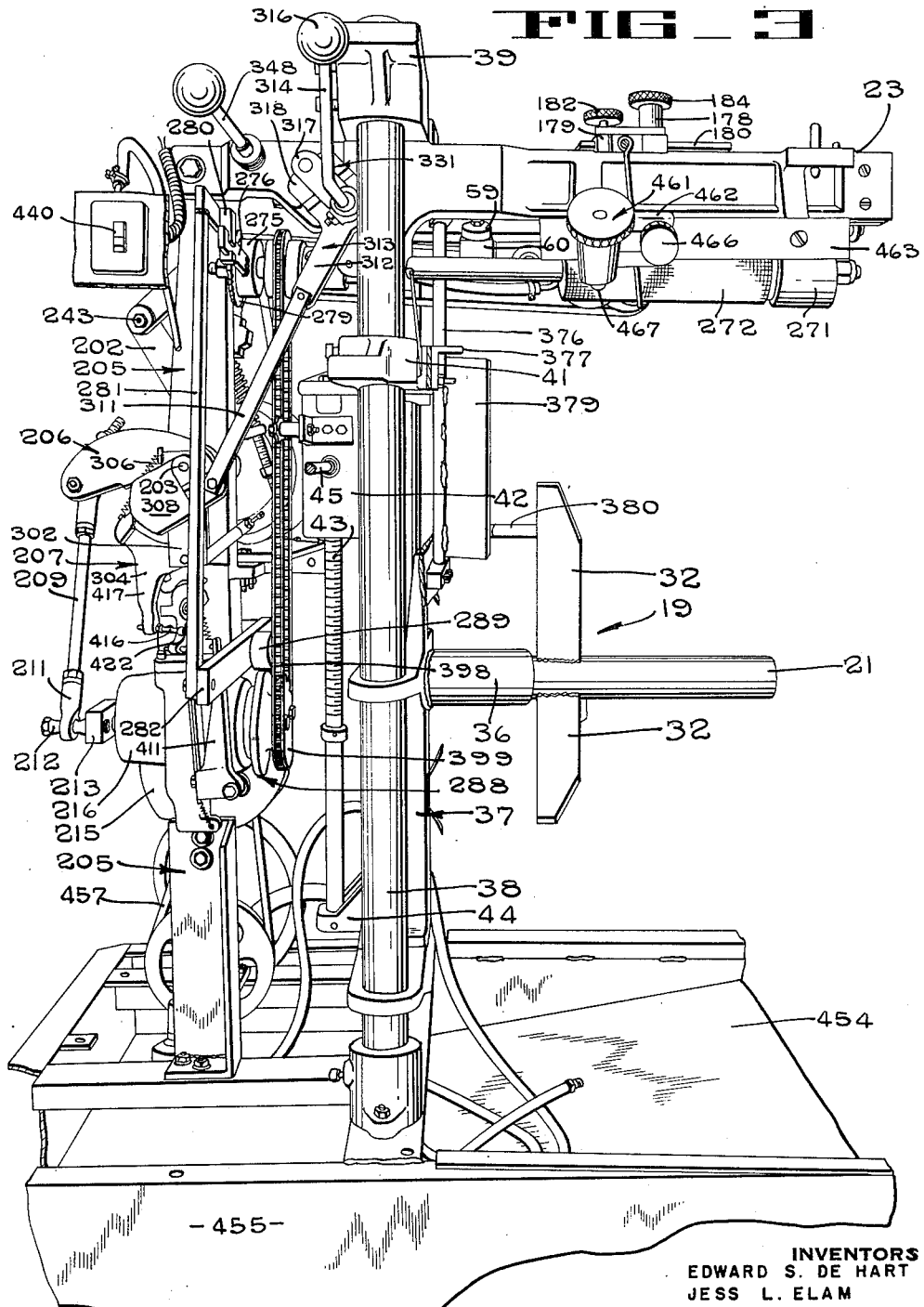

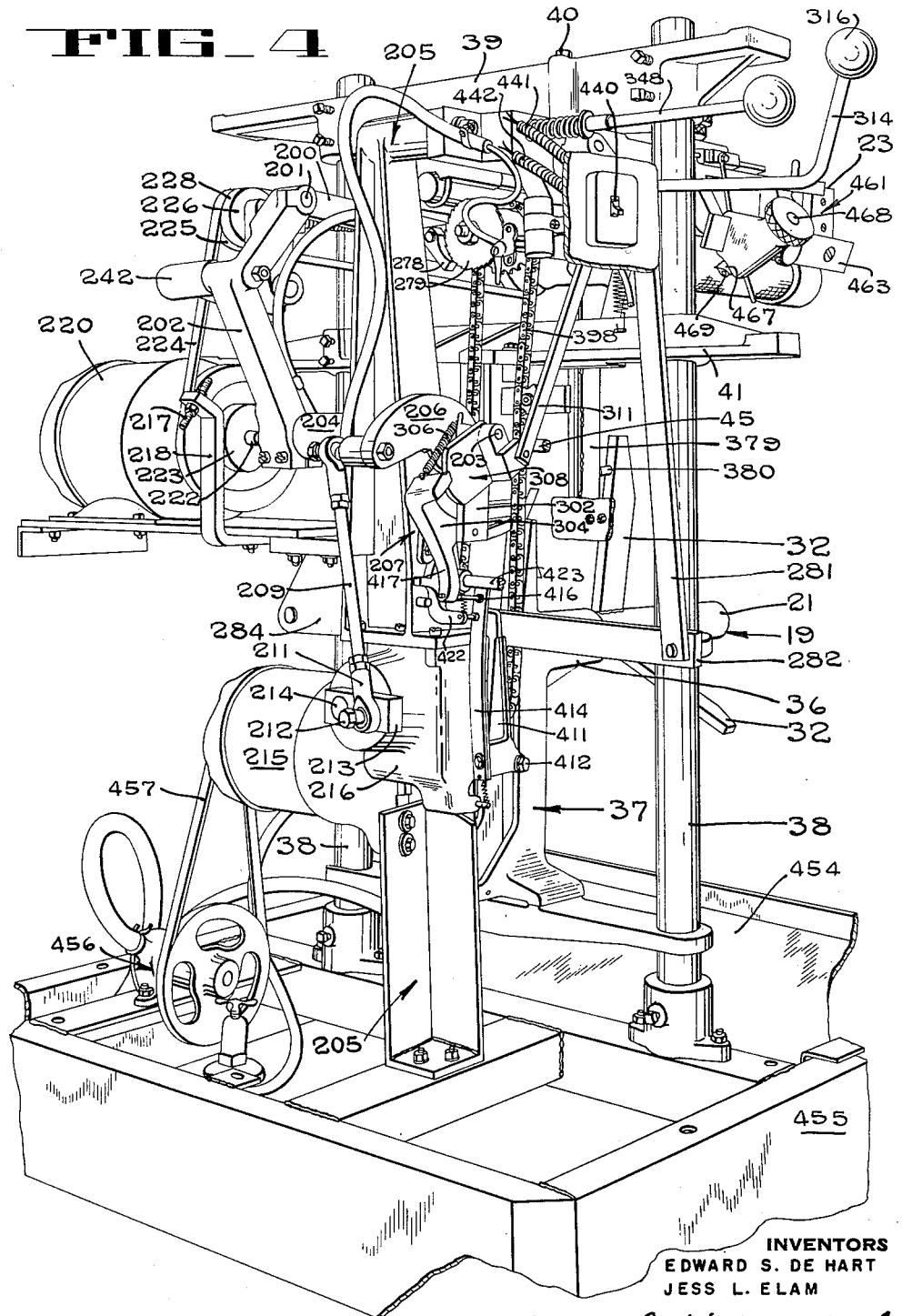
FIG_4

Filed Oct. 5, 1954     14 Sheets-Sheet 5

INVENTORS
EDWARD S. DE HART
JESS L. ELAM
BY *Hans G. Hoffmeister*
ATTORNEY

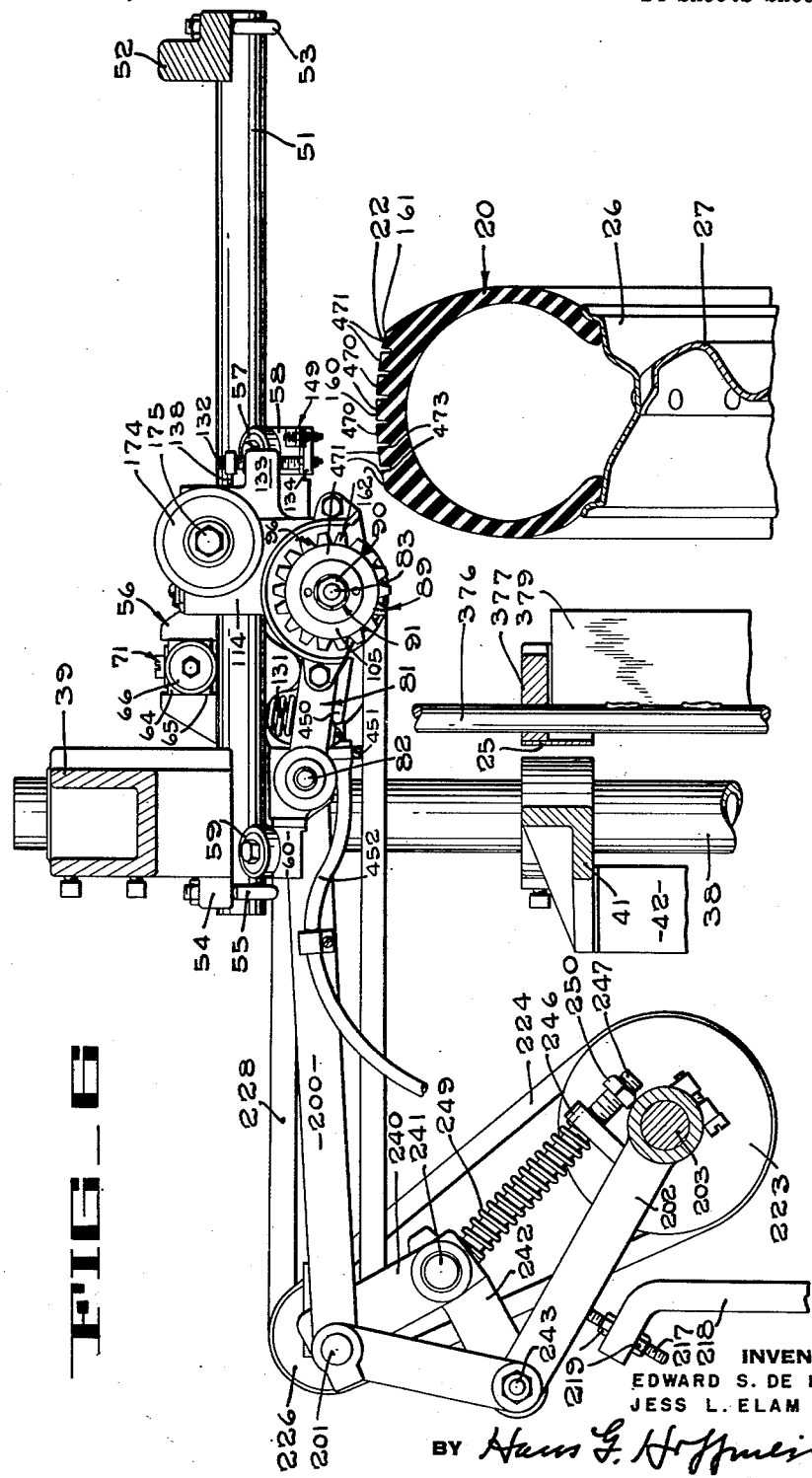

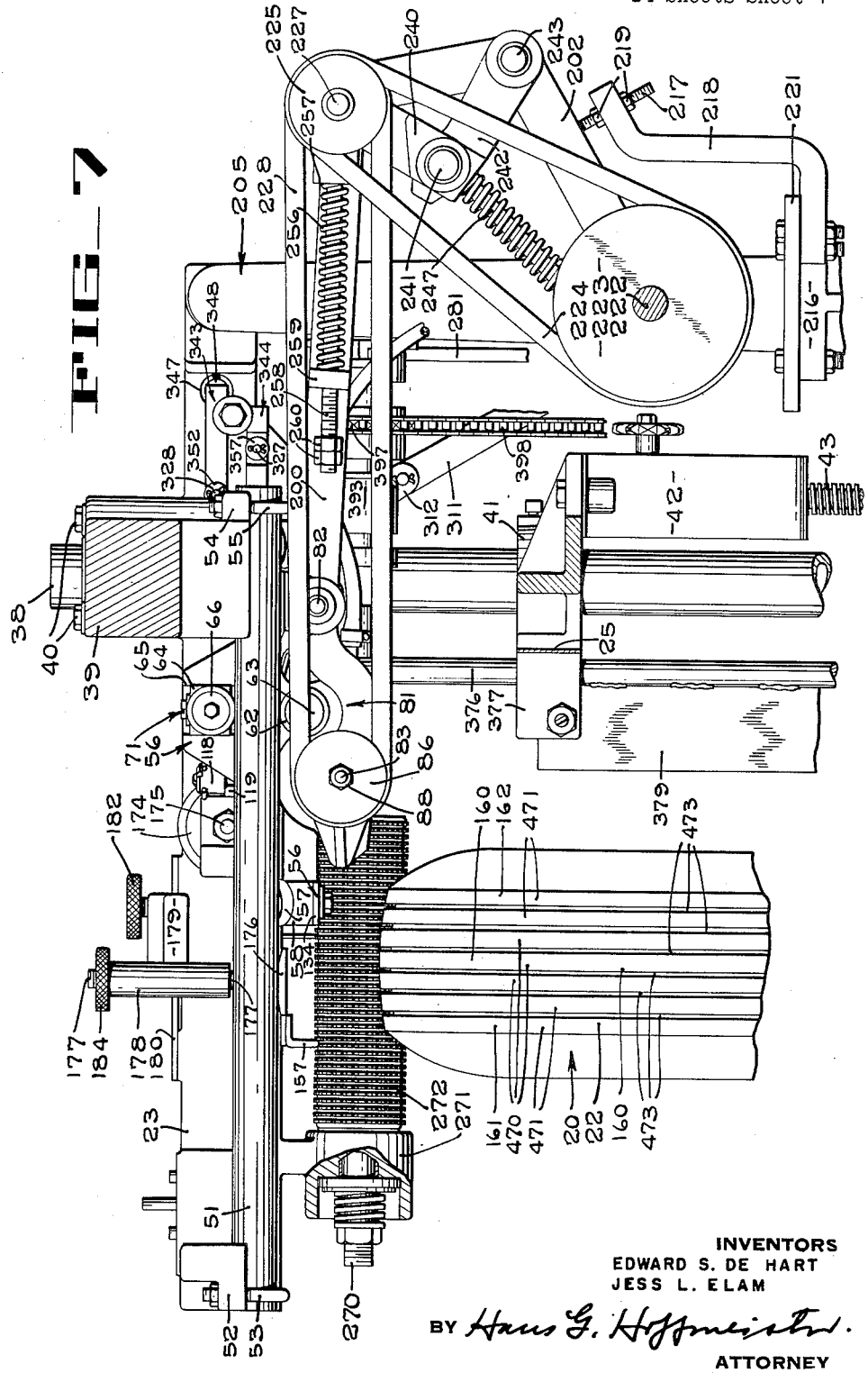

Dec. 17, 1957　　　E. S. DE HART ET AL　　　2,816,606
TIRE TREAD CUTTING MACHINE
Filed Oct. 5, 1954　　　　　　　　　　　14 Sheets-Sheet 8
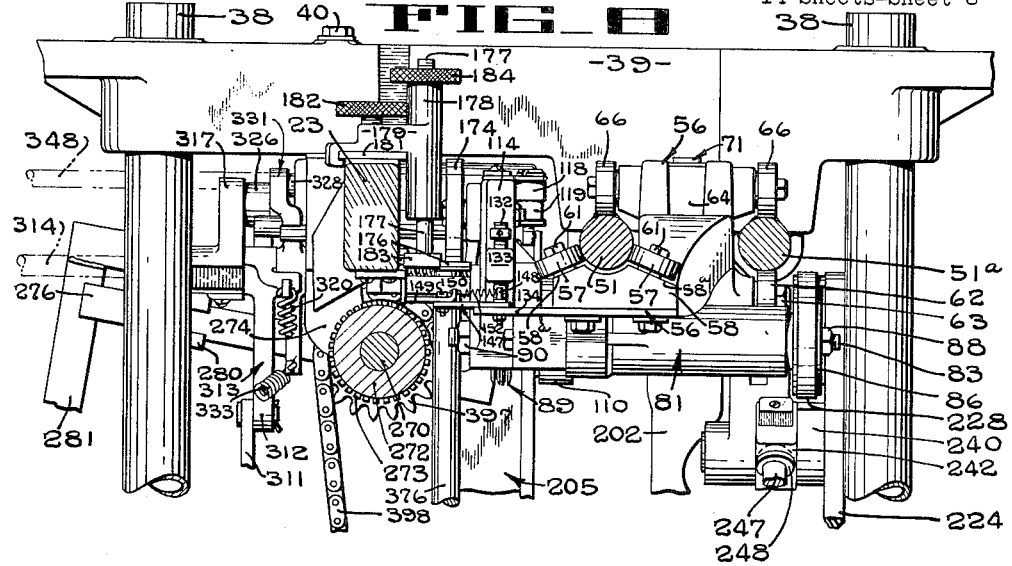
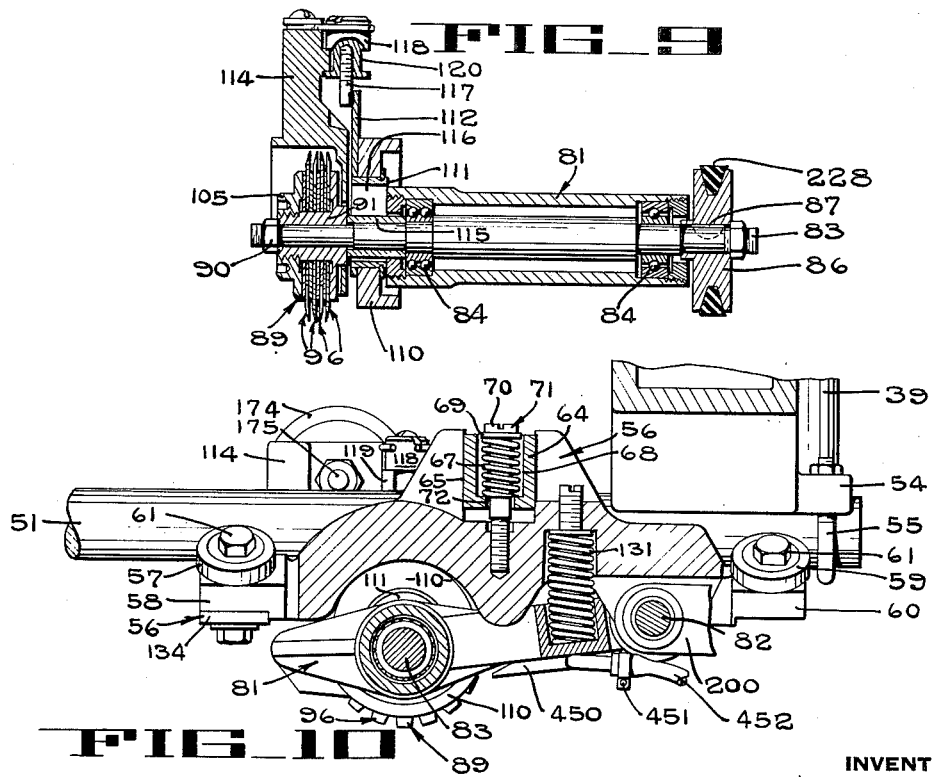
INVENTORS
EDWARD S. DE HART
JESS L. ELAM
BY Hans G. Hoffmeister
ATTORNEY Dec. 17, 1957  E. S. DE HART ET AL  2,816,606
TIRE TREAD CUTTING MACHINE
Filed Oct. 5, 1954  14 Sheets-Sheet 9
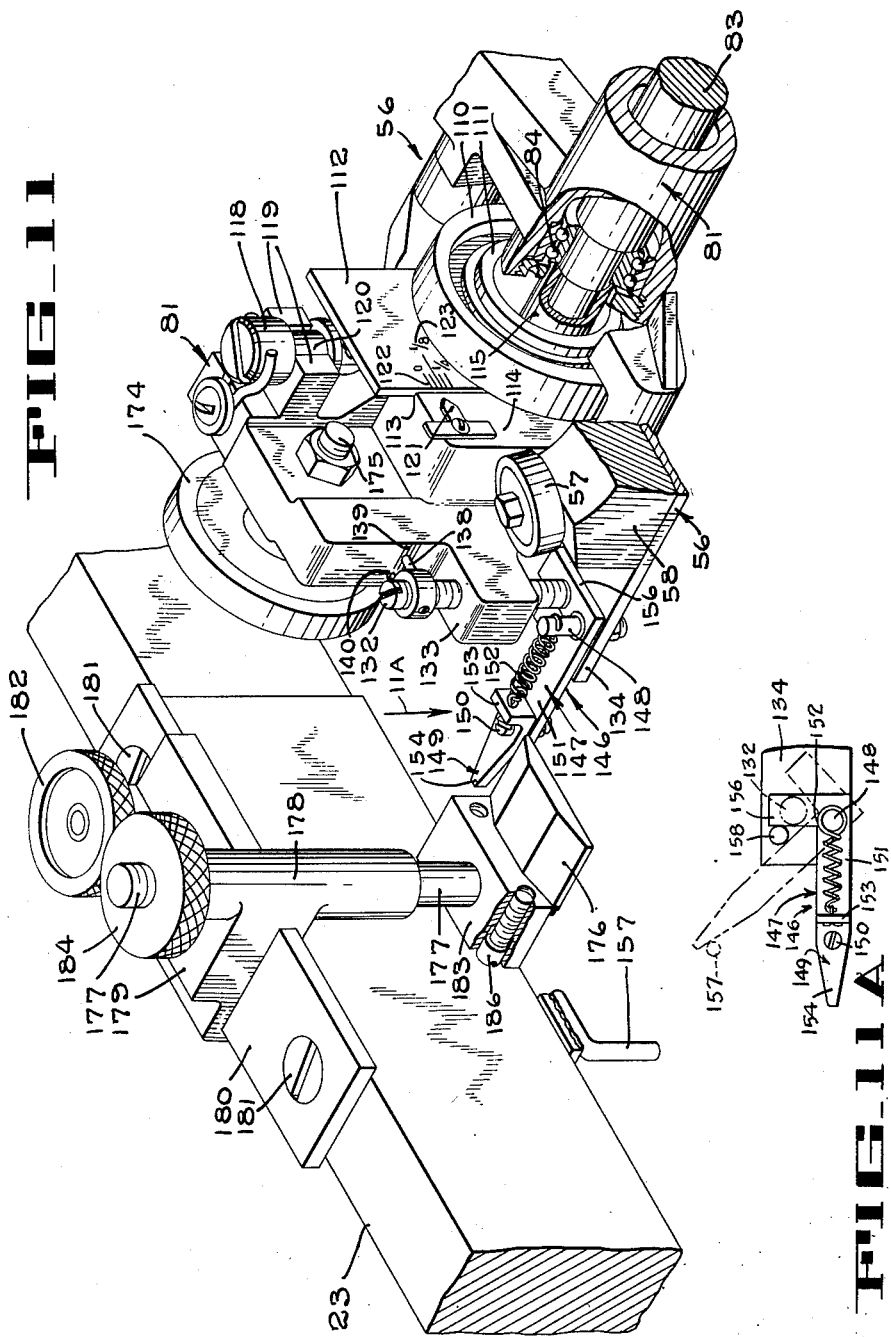
INVENTORS
EDWARD S. DE HART
JESS L. ELAM
BY Hans G. Hoffmeister
ATTORNEY

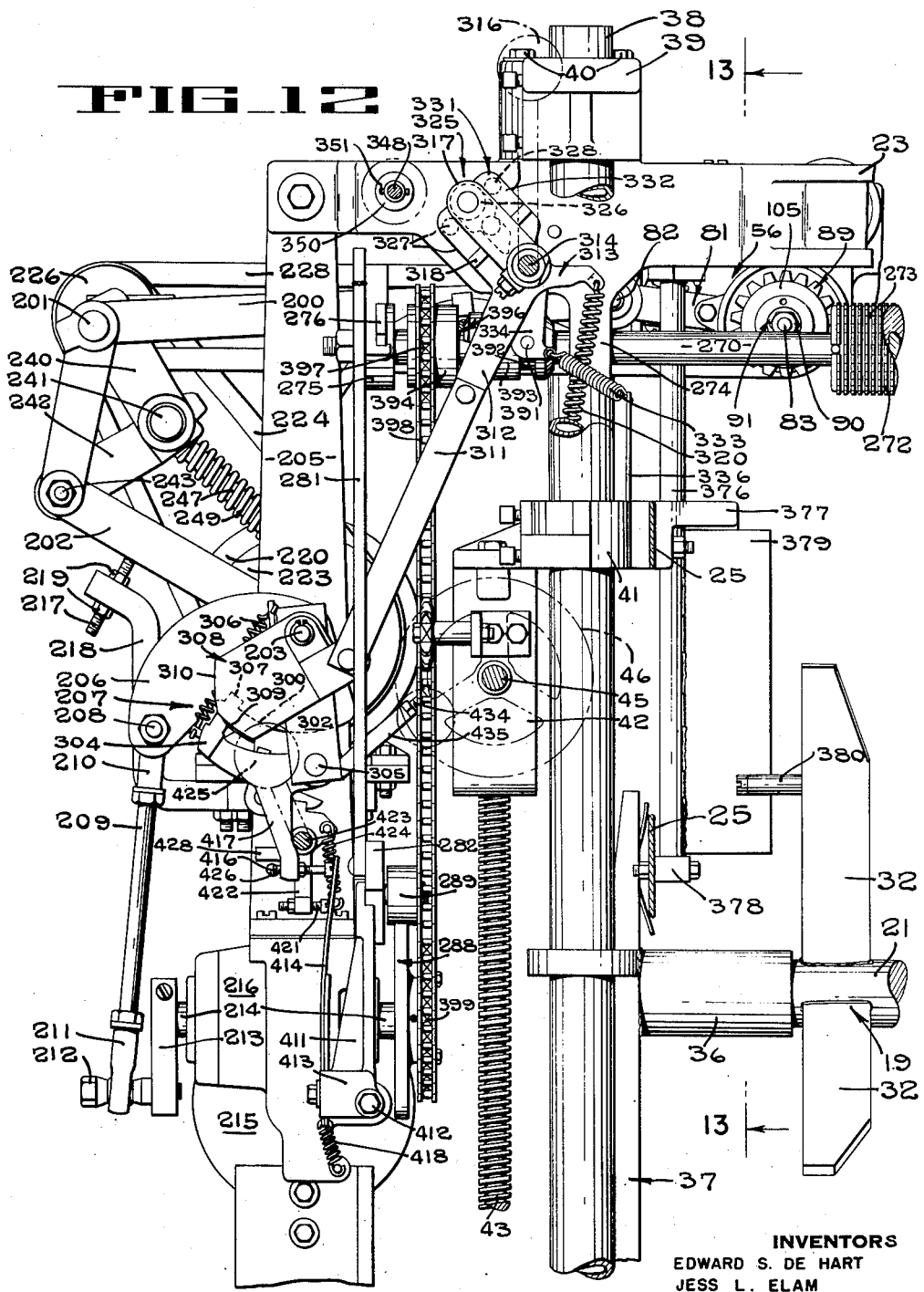

Dec. 17, 1957  E. S. DE HART ET AL  2,816,606
TIRE TREAD CUTTING MACHINE
Filed Oct. 5, 1954  14 Sheets-Sheet 11
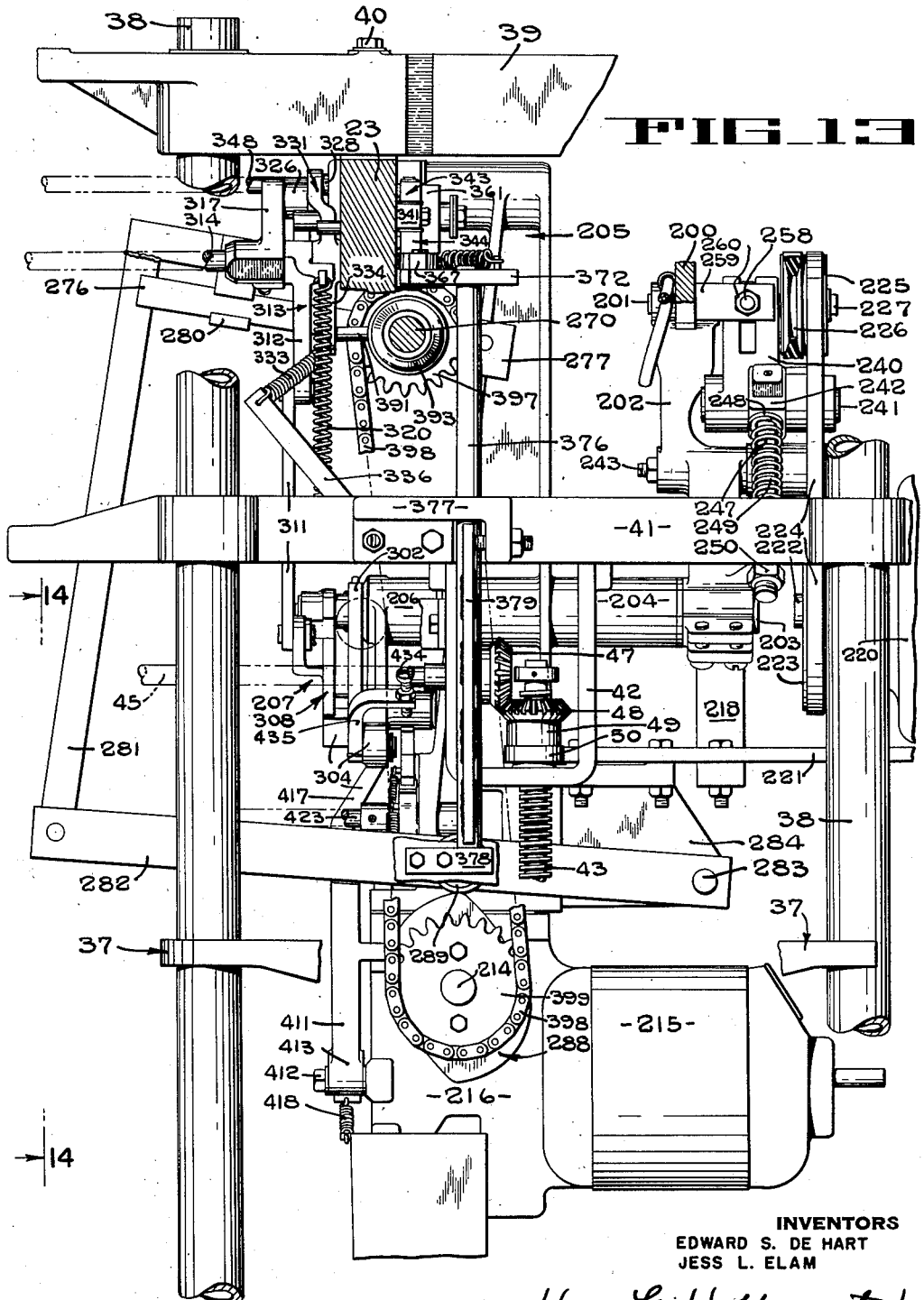
INVENTORS
EDWARD S. DE HART
JESS L. ELAM
BY Hans G. Hoffmeister
ATTORNEY Dec. 17, 1957    E. S. DE HART ET AL    2,816,606
TIRE TREAD CUTTING MACHINE
Filed Oct. 5, 1954    14 Sheets-Sheet 12
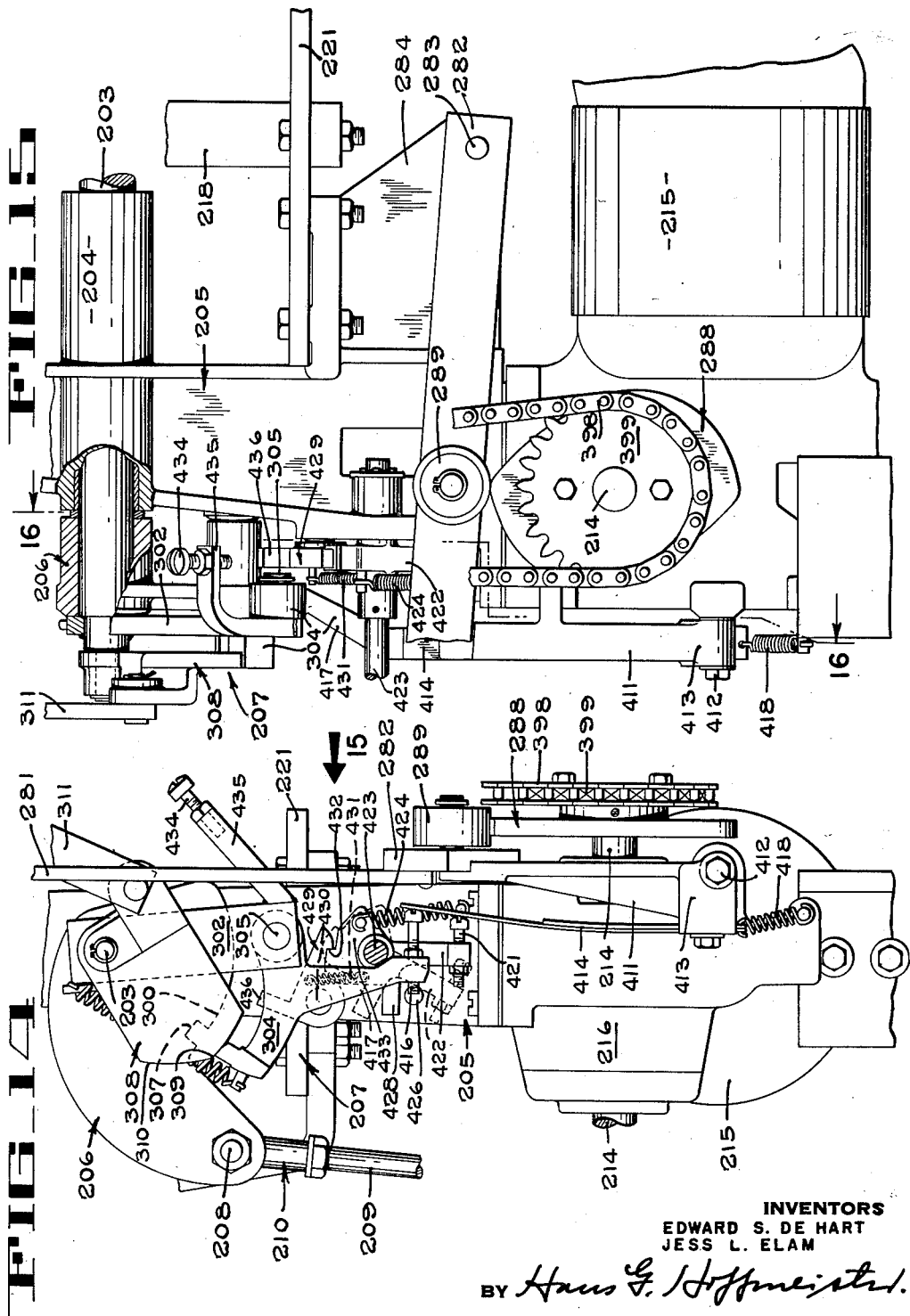
INVENTORS
EDWARD S. DE HART
JESS L. ELAM
BY *Hans G. Hoffmeister*
ATTORNEY Dec. 17, 1957 E. S. DE HART ET AL 2,816,606
TIRE TREAD CUTTING MACHINE
Filed Oct. 5, 1954 14 Sheets-Sheet 13
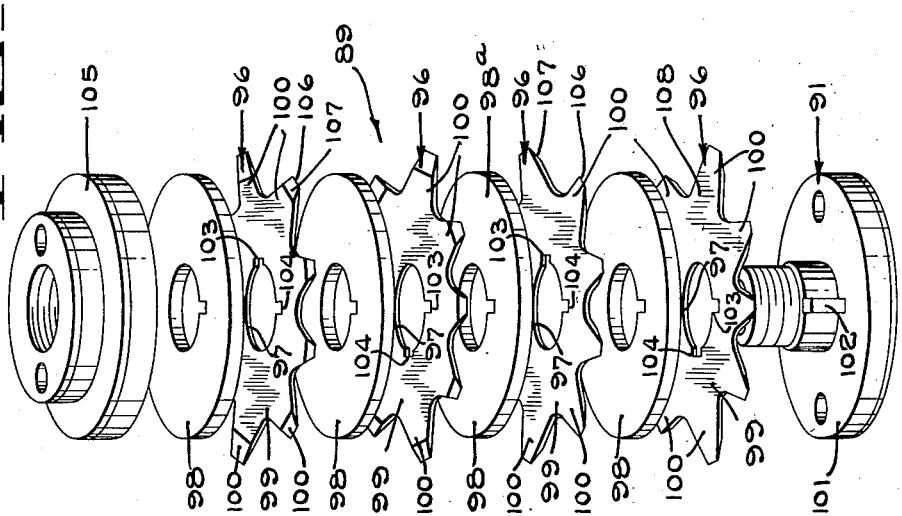
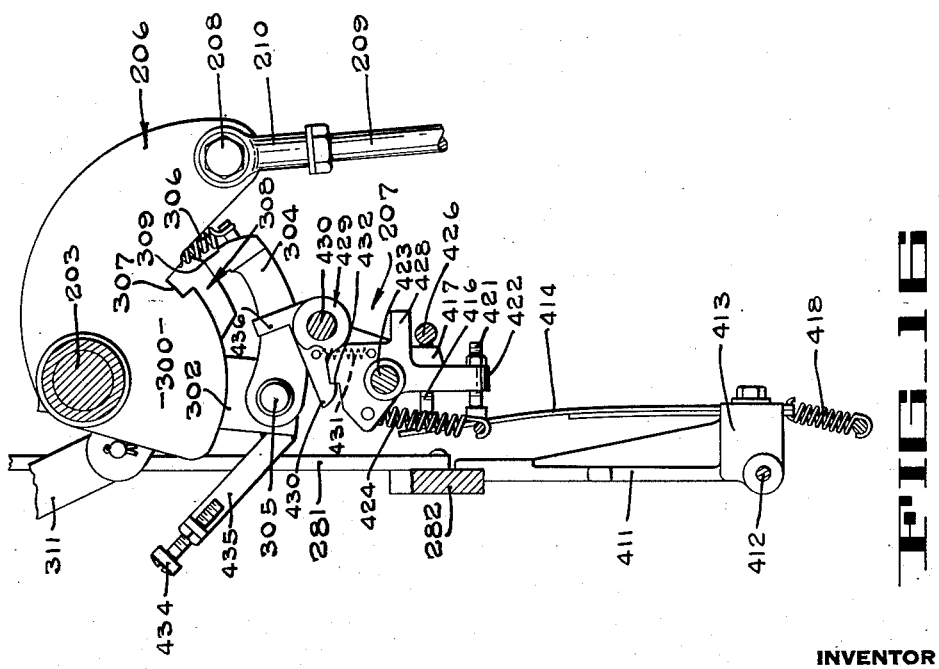
INVENTORS
EDWARD S. DE HART
JESS L. ELAM
BY *Hans G. Hoffmeister*
ATTORNEY Dec. 17, 1957   E. S. DE HART ET AL   2,816,606
TIRE TREAD CUTTING MACHINE
Filed Oct. 5, 1954   14 Sheets-Sheet 14
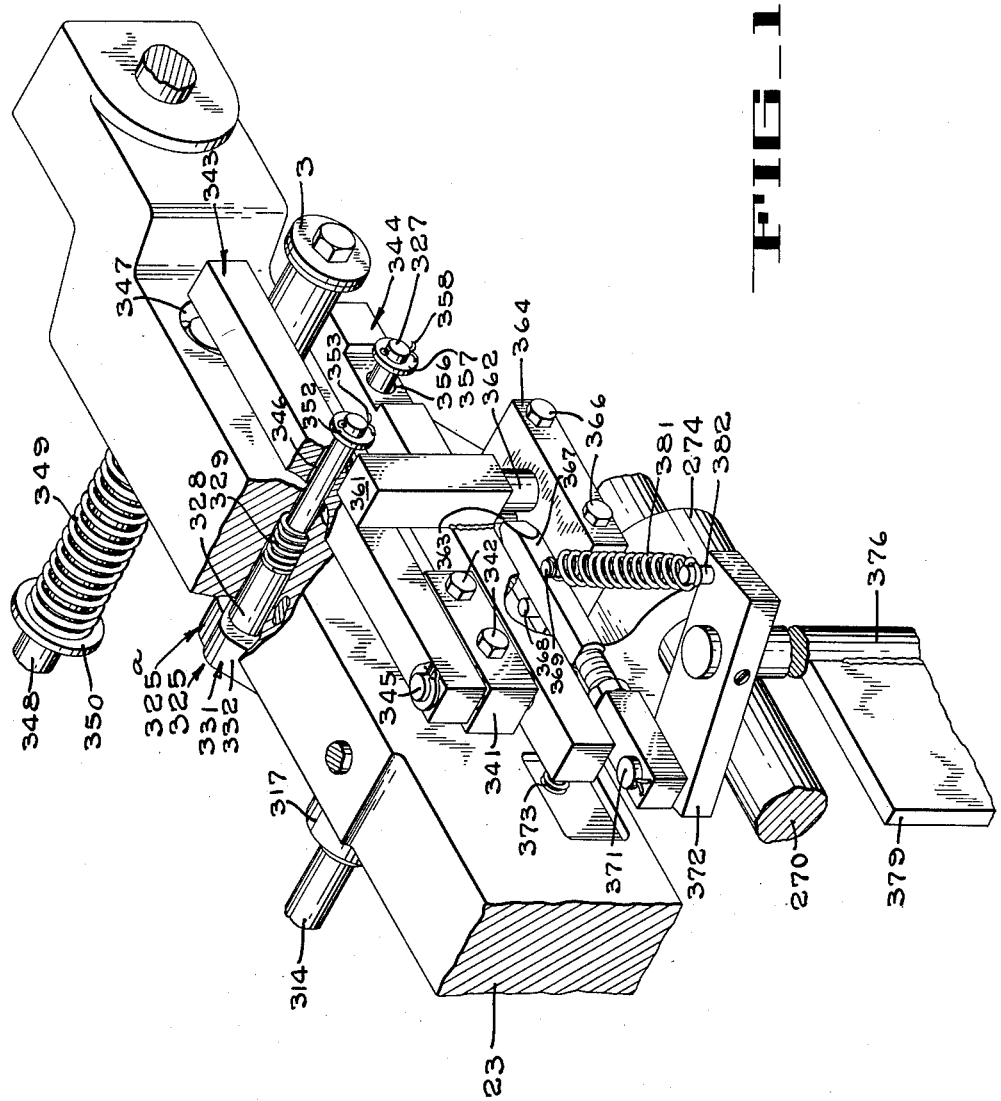
FIG_10
INVENTORS
EDWARD S. DE HART
JESS L. ELAM
BY Hans G. Hoffmeister
ATTORNEY United States Patent Office 2,816,606
Patented Dec. 17, 1957

2,816,606

TIRE TREAD CUTTING MACHINE

Edward S. DeHart, Collingswood, N. J., and Jess L. Elam, Lansing, Mich., assignors to Food Machinery and Chemical Corporation, San Jose, Calif., a corporation of Delaware Application October 5, 1954, Serial No. 460,418

12 Claims. (Cl. 164—10.2)

This invention relates to tire tread cutting apparatus.

An object of the invention is to provide an improved tire tread cutting machine.

Another object is to provide a tire tread cutting machine having novel gauging mechanism for regulating the depth to which a tire tread is cut.

Another object is the provision, in a tread cross-cutting machine, of a cooperating cutter and depth gauge adapted to attain uniformity of depth of cut throughout the entire width of the tread.

Another object is to incorporate an auxiliary adjustment within the tread crosscutting machine, capable of crosscutting at uniform depth throughout the full width of the tread, regardless of section size of the tire being treated.

Another object is to provide a tire tread crosscutting machine provided with means causing the cutter to skip a predetermined portion of the tread width and thereby leave that portion uncut, without, however, disturbing the uniformity in depth to which the remaining portions of the tread are cut.

Another object is to provide the mechanism for causing the cutter to skip a portion of the tread, in the form of an attachment readily added to and removed from the machine so as to make complete or partial crosscutting a matter of choice.

Another object of the present invention is to provide a tire tread crosscutting machine which is fully automatic to the extent that after initial setting, it will, without requiring the services or attention of an attendant, perform the operations of intermittently advancing a tire to successively present uncut areas to the cutter, and, between successive steps of advancement, actuate the cutter to transversely slit the tread of the tire, and to continue these operations until the tire has been crosscut at suitable intervals throughout substantially its entire circumference, whereupon the machine will shut itself off.

These and other objects and advantages of the invention will become apparent from the following description and the accompanying drawings, in which:

Figure 1 is a perspective of the tire tread cutting machine of the invention.

Figure 2 is a top plan of the tread cutting machine with the casing removed, showing operative portions of the mechanism.

Figure 3 is a perspective of the machine viewed in the direction of arrow 3 of Fig. 2.

Figure 4 is a perspective, viewed in the direction of arrow 4 of Fig. 2.

Figure 5 is a perspective, viewed in the direction of arrow 5 of Fig. 2.

Figure 6 is a section taken along the lines 6—6 of Fig. 2 and showing in elevation the movable carriage and the reciprocating mechanism therefor.

Figure 7 is a section taken along the lines 7—7 of Fig. 2, showing the mechanism of Fig. 6 from the opposite side.

Figure 8 is a section taken along the lines 8—8 of Fig. 2.

Figure 9 is a section taken along the lines 9—9 of Fig. 2.

Figure 10 is a section taken along the lines 10—10 of Fig. 2.

Figure 11 is a fragmentary perspective of the reciprocating carriage and the cutter-mounting frame carried thereby.

Fig. 11A is a fragmentary detail in plan, viewed as indicated by the arrow 11A of Fig. 11.

Figure 12 is a fragmentary elevation taken in the direction of the arrow 12 of Figure 2.

Fig. 13 is a section taken on the lines 13—13 of Fig. 12.

Figure 14 is a fragmentary elevation taken on the lines 14—14 of Fig. 13.

Figure 15 is an elevation, partly broken away, viewed as indicated by the arrow 15 of Fig. 14.

Figure 16 is a section taken along the lines 16—16 of Fig. 15.

Figure 17 is an exploded perspective of the cutter head of the machine of the invention.

Figure 18 is a fragmentary perspective of the manual and automatic mechanisms for stopping the tire cutting machine of the invention.

As clearly shown in Fig. 1, the tire tread cutting machine of the present invention comprises means 19 for mounting a pneumatic tire 20 for rotation about a horizontal spindle 21 which supports the tire with the uppermost portion of its tread 22 below and spaced but a short distance from a rigid, generally horizontal frame member 23. Both the frame member 23 and the spindle 21 project forwardly from the front wall 24 of a casing 25 within which the drive mechanism of the machine is enclosed.

The tire 20 is mounted upon the rim 26 of a suitable wheel 27 which is coaxially mounted on the spindle 21 by means of a centering cone 28 slidable on the spindle and adapted to be pressed tightly into the central hole 29 of the wheel 27 by a hand screw 30 having threaded connection with an anchoring collar 31 removably secured on the spindle 21. A plurality of co-planar arms 32 (Figs. 3, 5, and 12) rigid with the spindle 21 extend radially therefrom to assist in rigidly mounting the wheel 27 and its tire 20 on the spindle in a plane to which the axis of the spindle 21 is perpendicular.

The innermost end of the spindle 21 is mounted within a suitable bearing 36 (Figs. 3, 5, and 12) for free rotation with respect thereto but is secured against axial movement. The bearing 36 extends horizontally through a vertically elongated opening (not shown) in the front wall 24 of the casing 25 (Fig. 1) from a subframe 37 which is slidably mounted on two vertically spaced tubular columns 38 interconnected adjacent their upper ends by a crossbar 39 from which the frame member 23 is rigidly supported by cap screws 40 (Figs. 2, 7 and 8). A second, lower crossbar 41 rigid with the columns 38 supports a U-shaped bracket 42 (Figs. 3, 5, 12 and 13) through the bottom of which extends a vertical elevating screw 43 secured at its lower end to a foot 44 (Figs. 3 and 5) projecting from the subframe 37. A shaft 45 extends horizontally from outside of the casing 25, into the space enclosed by the bracket 42. The shaft 45 is provided on its outer end with a hand wheel 46 (Figs. 1 and 12), and within the bracket 42 the shaft 45 is connected by bevel gears 47 and 48 (Fig. 13) with a nut 49 threaded on the screw 43 and rotatably supported on a thrust collar 50 which, in turn, is supported on the bracket 42. Therefore, the spindle 21, the wheel 27, and the tire 20 may be raised or lowered by turning the hand wheel 46.

*Reciprocating carriage and support therefor*

Rigidly secured to the frame 23 are a pair of spaced horizontal rods 51 and 51a (Figs. 1, 2, 6, 7 and 8) both of which are parallel to the spindle 21. The forward ends of the rods 51 and 51a are rigidly connected by U-bolts 53 to a lateral extension 52 of the frame member 23, while the rear ends of the rods 51 and 51a are rigidly attached to horizontal flanges 54 (Figs. 2, 6 and 7) of the crossbar 39 by U-bolts 55. An underslung carriage 56 (Figs. 2, 5, 6, 8, 10 and 11) is supported from the rods 51 and 51a, which serve as tracks for guiding the carriage 56 in rectilinear, reciprocatory motion.

Two pair of guide rollers 57, 59 are rotatably mounted on the carriage 56 in position to make rolling contact with the rod 51 at locations within the lower half of the circumference of the rod. Of these rollers, one pair 57 (Figs. 2, 5, 6, 8, 10 and 11), is mounted on a platform 58 provided on the carriage 56 adjacent the forward end thereof, and the other pair of rollers 59 (Figs. 3, 5, 6, and 10) is rotatably mounted on a similar platform 60 (Figs. 3 and 6) adjacent the rear end of the carriage 56. As best shown in Fig. 8, the upper surface of the platform 58 includes two outwardly and downwardly sloping surfaces 58a and the rear platform 60 is of similar configuration. The rollers 57 and 59 are mounted for rotation on cap screws 61 perpendicular to the surfaces 58a with the result that the rollers 57 and 59 slope outward and downward from the guide rod 51 and the peripheries of the rollers 57 and 59 establish rolling contact with the guide rod 51 at points spaced apart by substantially 120°, each of which points is substantially 30° below the horizontal diametral plane of the rod 51. At the other side of the carriage 56 a single roller 62 (Figs. 5, 7, and 8) is mounted by a cap screw 63 for rotation about a horizontal axis and in position for its peripheral surface to make rolling contact with the underside of the guide rod 51a, as best shown in Fig. 8.

A crosshead 64 (Figs. 2, 6, 7, 8, and 10) is mounted for vertical movement in a transversely extending recess 65 (Fig. 10) in the upper surface of the carriage 56 and a roller 66 is mounted at each end of the crosshead 64 for rotation about a horizontal axis. The crosshead 64 is of such length that the rollers 66 are projected beyond the ends of the recess 65 and engage the upper sides of the rods 51 and 51a, as best shown in Figs. 2 and 8. The crosshead 64 is urged downward within the recess 65 by a coil spring 67 (Fig. 10) under compression between the bottom of a recess 68 in the top of the crosshead 64 and a washer 69 under the head 70 of a screw 71, the shank of which extends through a clearance hole 72 in the crosshead for threaded engagement with the carriage 56 below the recess 65. Thus it may be seen that the spring 67 continually presses the upper rollers 66 downward against the upper surface of the rods 51 and 51a and at the same time urges the rollers 57, 59 and 62 upward against the under surfaces of the rods 51 and 51a. In this manner, the carriage 56 is mounted on the rods 51 and 51a so that it is guided for rectilinear, reciprocatory motion by the rods.

*Cutter support and construction*

The carriage 56 supports a vertically movable frame 81 (Figs. 2, 6, 7, 8, 9, 10 and 11), the rear end of which is pivotally connected to the carriage by a shaft 82. A spindle 83 is rotatably mounted on the frame 81 adjacent the forward end thereof by anti-friction bearings 84 (Fig. 9). The spindle 83 is parallel to the pivot shaft 82 and both are perpendicular to the direction of reciprocation of the carriage 56. A pulley 86 is rigidly mounted on one end of the spindle 83 by a key 87 and nut 88. A multiple-blade rotary cutter head 89 is rigidly but removably mounted on the other end of the spindle 83 by a nut 90 threaded onto the associated end of the spindle 83 and bearing against the outer end of the hub 91 of the cutter head 89.

As shown in Fig. 17, the cutter head 89 comprises a plurality of cutter blades 96 having central apertures 97 fitted to the hub 91 and held in spaced apart relation by intervening spacing washers 98. Each of the cutter blades 96 includes a central portion 99 and a plurality of cutting teeth 100 extending radially therefrom at equally spaced intervals about the circumference thereof. The hub 91 of the cutter head 89 is provided with an end flange 101 and with a key 102; and each cutter blade 96 is provided with two keyways 103 and 104 each of which is fitted to the key 102 so that each cutter blade 96 can be mounted upon the hub 91 optionally in either of two positions. The keyway 103 is in radial alignment with one of the teeth 100, whereas the keyway 104 is in radial alignment with a space between two adjacent teeth 100. This permits mounting the cutter blades 96 on the hub 91 with the teeth of each disc 96 staggered from the teeth on each adjoining disc, as clearly shown in Fig. 17. The blades 96 and spacers 98 are clamped between the end flange 101 and a nut 105 threaded onto the opposite end of the hub 91.

Each of the teeth 100 of the cutter blades 96 is sharpened to a cutting edge 106 defining the outer end of the tooth, and this cutting edge is formed by a bevel 107 on only one side of the tooth. Moreover, the teeth 100 of each cutter blade 96 are all thus beveled on corresponding sides, leaving flat sides 108 of the teeth at the other face of the blade. Preferably there is an even number of the cutter blades 96, permitting equal numbers of blades 96 to be mounted on opposite sides of a central spacing washer 98a. The cutter blades 96 are so arranged on the hub 91 that the beveled sides of the teeth 100 of each disc face away from the central spacing washer 98a as is likewise clearly shown in Fig. 17.

*Cutting depth gauge*

A depth gauge roller 110 (Figs. 2, 8, 9, 10, and 11) is carried by the frame 81 closely adjacent the cutter head 89 and in position to make rolling contact with the tire to limit the depth to which the blades 96 penetrate the tread 22 of a tire being crosscut. The roller 110 is mounted on the frame 81 for adjustment of the axis of the roller 110 in a substantially vertical plane which includes the axis of the cutter spindle 83. Toward this end, the roller 110 is journalled on a hollow hub 111 (Fig. 9) extending laterally from a plate 112 which is slidable in a guideway 113 (Figs. 2 and 11) formed in a vertical face of an extension 114 of the pivoted frame 81. As will be seen by referring to Fig. 9, both the cutter spindle 83 and a tubular spacer 115 through which the spindle extends, project through the bore 116 of the hub 111, which bore exceeds in diameter the outer circumference of the bushing by an amount sufficient to permit the desired extent of vertical adjustment of the depth gauge roller 110 with respect to the cutter 89. A rod 117 extending upward from the top edge of the roller-support plate 112 is threaded into an adjusting nut 118 (Figs. 2, 8, 9, and 11) which is rotatably supported and held against axial movement by a flange 119 extending from another vertical face of the frame extension 114 and seating within a circumferential slot 120 in the nut 118. An indicating pointer 121 (Fig. 11) carried by the frame extension 114 is cooperatively associated with graduation marks 122 and calibrations 123 on the roller-support plate 112, in such a manner that it indicates the depth to which the cutter blades 84 will penetrate the tire bead for any given setting of the gauge roller 110.

A coil spring 131 (Fig. 10) under compression between the carriage 56 and the pivoted cutter-carrying frame 81, continually urges the frame 81 downward to that position wherein the cutter teeth 100 will penetrate the tread of a tire and the depth gauge roller 110 will make rolling contact with the outer face of the tread. However, in the absence of a tire under the reciprocating carriage 56, or when the carriage is in any portion of its stroke disposing the roller 110 out of tire-engaging position, downward motion of the roller-support frame 81 is limited by an adjustable screw 132 (Figs. 2 and 11) threaded through a projection 133 of the frame extension 114. A stop plate 134 secured to the carriage 56 extends laterally therefrom to a position underlying the lower end of the screw 132. The screw 132 carries a pointer 138 cooperatively associated with graduations 139 on the frame extension 114 and spaced apart a distance corresponding to the pitch of the thread of the screw 132, with the result that by turning the screw 132 through one full turn the pointer 138 may be brought into registry with the next successive graduation 139. Calibrations 140 are associated with the graduations 139, evaluating the graduations to signify particular tire section sizes, the graduation 139 appropriate to the largest tire section size being at the top of the scale and that appropriate to the smallest tire section size being at the bottom of the scale.

It has been found that if the frame drops to the same position at both ends of the carriage stroke, the depth of cut tapers off in the portion of the tread last traversed by the cutters 96 during the outward stroke of the carriage 56, to less than that produced in the other portions of the tread. The cause of this difference in depth of cut is not fully understood. It is believed, however, that this difference in depth of cut may at least in part be due to distortion of the tread material or deflection of the carriage support under cutting pressure. Therefore, a compensating device 146 (Figs. 11 and 11A) for equalizing depth of cut throughout tread width is provided in the form of an L-shaped bracket 147 pivotally mounted on the stop plate 134 by a vertical pivot pin 148. An extension 149 is pivoted by a pin 150 to the outer end of one leg 151 of the bracket 147 and is normally held in alignment with the bracket leg 151 by a spring 152 under tension between the pin 148 and an upstanding flange 153 carried by the extension 149 at the opposite side of the pivot 150 from the outer end 154 of the extension. The other leg 156 of the L-shaped bracket 147 extends over the stop plate 134 and normally to a position underlying the screw 132, thus providing a shim, i. e., a slightly higher abutment stop than the plate 134, for limiting the depth to which the cutters 96 will penetrate the tire tread. A finger 157 extends rigidly downward from the frame member 23 in position to be engaged by the extension 149 when the carriage is moving in either direction and while the cutting depth gauging roller 110 supports the frame 81 by resting upon the tire tread. During the outward stroke of the carriage, the effect of engagement of the extension 149 with the finger 157 is to swing the entire bracket 147 and extension 149 clockwise (Fig. 11) about the pivot pin 148 until the leg 156 of the bracket 147 is removed from under the screw 132. Immediately thereafter, the leg 151 of the bracket 147 engages a stop pin 158 (Fig. 11A) carried by the plate 134 as shown in phantom lines in Fig. 11A, which prevents further rotation of the bracket 147. Consequently, continued outward motion of the carriage 56 while the extension 149 engages the finger 157, causes the extension 149 to pivot about the pin 150, against the urgency of the spring 152 which returns the extension 149 to its position of alignment with the bracket leg 151 as soon as the outer end of the extension 149 clears the finger 157.

The bracket leg 156 is thus withdrawn from under the screw 132 while the gauging roller 110 is in engagement with an intermediate portion 160 (Fig. 6) of the tire tread 22. Therefore, as the roller 110 moves past the shoulder 161 which represents the outermost lateral edge of the tread 22 and therefore permits lowering of the frame 81, the frame 81 moves to a slightly lower position, i. e., a position determined by engagement of the screw 132 with the upper surface of the plate 134 rather than with the bracket leg 156. Therefore during the final portion of their outward stroke and the initial portion of their inward stroke, the cutters 96 penetrate the tread 22 to a slightly greater depth than would be the case were the screw 132 supported on the bracket leg 156.

During the return stroke of the carriage 56 and cutters 96, and after the gauging roller 110 has again engaged the tire tread and lifted the frame 81 and with it the screw 132 high enough to clear the bracket leg 156, the extension 149 again engages the finger 157. This causes the bracket 147 to return to that position in which the leg 156 is disposed under the screw 132, where motion of the bracket 147 is arrested by engagement of the leg 156 with the stop pin 158, as shown in full lines in Fig. 11A. Thereafter continued retractive motion of the carriage causes the extension 149 to pivot about the pin 150 until its outer end clears the finger 157, whereupon the spring 152 again returns the extension to its position of alignment with the bracket leg 151.

Return of the bracket leg 156 to operative position during the inward stroke of the carriage 56, prevents the frame 81 from dropping to the same lowered position as hereinabove described, when the gauging roller 110 moves past the shoulder 162 representing the innermost lateral edge of the tread 22. At this side of the tire the relationship of the tread curvature to the angularity of the frame 81, as best revealed in Fig. 6, is such that, with the frame 81 supported by the screw 132 resting on the bracket 147, the cutters 96 will penetrate the tread 22 to the same depth as that attained at the outermost side of the tire with he screw 132 resting directly on the plate 134.

*Skip cutting control*

Means are provided for temporarily lifting the entire cutter-carrying frame 81 so as to withdraw the cutters 96 from tread-engaging position while they traverse a predetermined portion of the width of the tread 22 of a tire 20 being crosscut. For this purpose a camming roller 174 (Figs. 2, 8, 10, and 11) is journalled on a horizontal pin 175 extending rigidly from the side of the frame extension 114 nearer the frame member 23. A cam plate 176 extends laterally from the lower end of a vertical post 177 slidably received within a vertical sleeve 178 carried by a head 179 which is mounted for longitudinal sliding movement upon a guide plate 180 affixed by screws 181 to the upper surface of the frame member 23. The head 179 is provided with a clamping screw 182 for releasably locking the head 179 in selected position of adjustment longitudinally of the plate 180. One edge of the block 183 whereby the cam plate 176 is connected to the post 177 bears slidably against the inner vertical face of the frame member 23 to restrain the cam plate 176 against rotation about a vertical axis and thereby retain it in position for the camming roller 174 to ride upon the cam 176 and thus lift the entire cutter bearing frame 81 while the carriage 56 traverses a portion of its stroke corresponding to the length of the cam 176. The height of such lift is determined by the vertical adjustment of the cam 176, which adjustment is attained by manipulation of a knurled nut 184 threaded onto the upper end of the post 177 and bearing against the upper end of the sleeve 178. Screws 186 threadedly engaged with the block 183 and disposed at opposite sides of the axis of the supporting post 177 are adjusted to engage the adjacent, vertical side face of the frame member 23 to ensure rigidity of the cam 176 in its selected position of adjustment.

*Carriage reciprocating mechanism*

Powered apparatus is provided for reciprocating the carriage 56 on the guide rods 51 and 51a to cause the cutter blades 96 to transversely slit the tread 22 of a tire 20 mounted on the spindle 21. One end of a connecting rod 200 (Figs. 2, 4, 5, 6, 10, 12 and 13) is mounted for rotary motion on the hereinbefore mentioned pivot shaft 82 whereby the cutter carrying frame 81 is attached to the carriage 56, while the other end of the connecting rod 200 is similarly mounted on a pin 201 rigid with the upper end of a generally upright angulated arm 202, best shown in Figs. 4, 12, and 13. The lower end of the arm 202 is affixed to one end of a horizontal rock shaft 203 (Figs. 2, 4, 6, 12, 14, 15, and 16) journalled in a bearing 204 (Fig. 4) rigid with a fixed upright frame member 205. A crank arm 206 is mounted for free rotation on the rock shaft 203 adjacent the other end thereof, but is adapted to be connected thereto so that the shaft 203 will be turned by the crank arm 206 upon engagement of a releasable clutch mechanism 207 which will be described more fully hereinbelow. The crank arm 206 carries a crank pin 208 to which the upper end of a pitman 209 is universally connected by a ball and socket joint 210. Another ball and socket joint 211 similarly connects the lower end of the pitman 209 to the pin 212 of a crank 213 carried by a power output shaft 214 which is adapted to be rotated at constant speed by a motor 215 to which the shaft 214 is operably connected by suitable reduction gearing, not shown, enclosed within a housing 216 which conveniently constitutes a portion of the upright frame member 205.

Thus it may be seen that operation of the motor 215 causes the upper end of the arm 202 to move back and forth in a substantially horizontal direction to reciprocate the carriage 56 by means of the connecting rod 200. An adjustable stop for limiting the inward stroke of the carriage 56 is provided in the form of a screw 217 (Figs. 4, 6, and 7) threaded through a bracket 218 rigid with the frame member 205 in position for the screw 217 to engage the arm 202. Lock nuts 219 clamp the screw 217 in selected position of adjustment.

Rotary cutter drive

A second motor 220 is supported from the frame member 205 by a platform 221 with the output shaft 222 of the motor 220 in axial alignment with the rock shaft 203 on which the bracket 202 is mounted. A drive pulley 223 on the motor shaft 222 is connected by a belt 224 to one of two rigidly interconnected intermediate pulleys 225 and 226 (Fig. 2) which are freely rotatable on a stub shaft 227 mounted in approximate alignment with, but adjustable with relation to, the aforesaid pin 201. The other of said interconnected pulleys 225 and 226 is connected by a belt 228 to the previously mentioned pulley 86 on the rotary cutter spindle 83 (Fig. 9).

As best illustrated in Figs. 6, 7, and 12, the mounting for the adjustable stub shaft 227 comprises a substantially upright bracket 240 to the upper end of which the stub shaft 227 is affixed and whose lower end is pivotally connected by a pin 241 to the outer end of a generally horizontal link 242 pivoted by a pin 243 to the arm 202 intermediate the ends of the latter. The arm 202 is provided with an angularly extending lug 246 (Fig. 6), and a rod 247 extends loosely through a suitable aperture (not shown) in the lug 246 from which the rod 247 inclines upward to dispose its upper end in abutting relation with the hub portion of the link 242 through which the pin 241 extends. As shown in Figs. 5 and 8, the upper end of the rod 247 is provided with a hemispherical head 248 which seats within a complementary recess (not shown) in the under surface of the said hub of the link 242. Since the head 248 is of larger diameter than the rod 247 it presents a downwardly facing shoulder, and a coil spring 249 is under compression between this shoulder and the lug 246. The effect of the spring 249, therefore, is to continually press the pivot pin 241 upward and to the right as viewed in Fig. 7, and since the pin 241 is connected by the bracket 240 to the stub shaft 227 on which the pulleys 225 and 226 are journalled, the effect of the spring 249 is to maintain suitable operating tension in the belt 224. A nut 250 (Fig. 6) threaded onto the rod 247 below the lug 246 serves as an abutment stop, limiting motion of the rod 247 in the direction in which it is urged by the spring 249, in the event of breakage of the belt 224.

The belt 228 is similarly tensioned by a coil spring 256 (Figs. 2 and 7) under compression between a shoulder 257 on a rod 258 and a lug 259 which is rigid with the connecting rod 200 and through which one end of the rod 258 slidably extends. The other end of the rod 258 is pivoted on the stub shaft 227 so that the effect of the spring 256 is to continually urge the stub shaft 227 to the right, as viewed in Fig. 7, and thereby maintain suitable working tension in the belt 228. Nuts 260 are threaded on the rod 258 beyond the lug 259 from the spring 256 to provide a limit stop for the rod.

Intermittent feed

Means are provided for intermittently rotating the wheel 27 and its tire 20 to present successive uncut portions of the tread 22 to the cutters 96. A shaft 270 extending horizontally through the front wall 24 of the casing 25 is rotatably supported at its outer end by a bracket 271 (Figs. 1 and 3) extending downward from the frame member 23. The shaft 270 is parallel to the tire-mounting spindle 21 and is in such position that a feed roller 272 rigid with the shaft 270 adjacent the bracket 271 is engaged by the tread 22 of a tire 20 when the latter is in position for its tread to be cut by the cutter blades 96 upon reciprocation of the carriage 56. The circumferential surface of the roller 272 is provided with knurling 273 to enhance the positive nature of the driving relationship between the roller 272 and the tire 20. Within the casing 25 the shaft 270 is journalled in a bracket 274 (Figs. 8 and 12) extending rigidly downward from the horizontal frame 23.

A collar 275 (Figs. 2, 3 and 12) is mounted for free rotary motion on the shaft 270 adjacent the inner end thereof, and oscillatory rocking motion is imparted to the collar 275 by an arm 276 (Fig. 3) extending rigidly therefrom. A second arm 277 (Fig. 4) rigid with the collar 275 and extending in the opposite direction therefrom, carries a pivoted pawl 278 pressed by a spring (not shown) against a ratchet wheel 279 (Figs. 3 and 4) which is rigid with the shaft 270, to impart step-by-step unidirectional rotation to the shaft 270 and the tire-driving roller 272 in response to vertical reciprocation of the outer end of the arm 276. A slidable block 280 (Figs. 3 and 13) is adapted to be clamped in selected position of adjustment on the arm 276 by a set screw (not shown), and a push rod 281 is pivoted at its upper end to the block 280 and at its lower end to the outer end of a lever 282 which extends substantially horizontally past and adjacent the crank shaft 214 to its point of pivotal support by a pin 283 carried by a frame member 284 (Figs. 13 and 15). A double-lobed cam 288 on the crankshaft 214 is engaged by a follower roller 289 rotatably mounted on the lever 282, so as to lift the lever 282 and thus impart rotary motion to the tire-advancing roller 272 twice during each complete reciprocation of the carriage 56. It should be observed at this point that the pawl 278, the double-lobed cam 288, and the crank 213 are so interrelated that such motion of the roller 272 occurs while the crankshaft 214 is at its dead center positions, and consequently, while the carriage 56 is at or adjacent the ends of its stroke. This assures that the tire-advancing roller 272 will be turned only at those times when the cutters 96 are withdrawn from the tire.

The distance through which the tire is turned each time the cutters come to rest at either side of the tire should be sufficient to space adjacent slits made during two successive passes of the carriage by a distance substantially corresponding to the space between each two cutters 96 of the cutter head 89. In this manner substantially equal spacing is attained between slits throughout the entire circumference of the tire. Such spacing is attained by sliding the block 280 along the arm 276 to vary the effective length of the latter, and thereby regulating the angular distance through which the arm 276 turns the roller shaft 270 each time the lever 282 is raised by the cam 288.

Automatic stop

The apparatus includes mechanism for automatically stopping reciprocation of the carriage 56, and interrupting operation of the tire-advancing feed roller 273 when a tire has been rotated far enough to present substantially the entire circumference thereof to the cutters 96. As pointed out previously herein, the crank arm 206 is continually swung up and down about the axis of the rock shaft 203 so long as the motor 215 operates, and operation of the carriage reciprocating mechanism is dependent upon engagement of the clutch 207 (Figs. 3, 12, 14, 15, and 16). A sector plate 300, formed integrally with crank arm 206 is disposed concentrically with respect to the rock shaft 203. Rigidly affixed to the rock shaft 203 is a crank 302 to the outer end of which a latch dog 304 is pivoted by means of a suitable pin 305. A tension spring 306 continuously urges the dog 304 toward the sector plate 300, which is provided with a notch 307 adapted to receive the latch dog 304 to lock the crank 302 to the crank 206, and thus impart the rocking motion of the crank 206 to the rock shaft 203 to effect reciprocation of the carriage 56 as hereinabove explained. However, the dog 304 can seat within the notch 307 only when a camming plate 308, which is rotatably mounted on the shaft 203, is turned so as to withdraw its high portion 309 from the position in which it is illustrated in Fig. 14, and present instead its low portion 310 to the dog 304.

The camming plate 308 is connected by a link 311 to one leg 312 of a bell crank 313 (Figs. 3 and 12) freely rotatable on a rotatably mounted control rod 314 extending through a side wall of the casing 25 above the spindle-elevating hand wheel 46. A handle 316 (Fig. 1) on the control rod 314 outside the casing facilitates turning the rod; and an arm 317 rigid with the rod 314 adjacent the bell crank 313 engages the other leg 318 of the bell crank 313 so that if the rod 314 is turned counter-clockwise, as viewed in Figs. 3 and 12, the bell crank 313 is turned in the same direction. Such motion of the bell crank 313 is transmitted to the camming plate 308 by the link 311, turning the camming plate 308 counter-clockwise from its Fig. 12 position, which permits the latch dog 304 to ride on the arcuate edge of the sector plate 300 until the notch 307 moves into registry with the dog, whereupon the spring 306 presses the dog 304 into the notch 307, locking the crank 304 and rock shaft 203 to the crank 206 for rocking motion therewith, as hereinabove explained.

Conversely, if the camming plate 308 is returned to its Fig. 12 position, the next succeeding downstroke of the lever 206 will cause the dog 304 to ride from the low portion 310 of the camming plate 308 onto the high portion 309, withdrawing the dog 304 from the notch 307 and thereby releasing the crank 302 from the constantly reciprocating lever 206. A tension spring 320 (Fig. 12) constantly urges the bell crank 313 to that position wherein the cam plate 307 is held in dog-retracting position, but the selector mechanism 325 of which the bell crank 313, control rod 314, and lever 317 are parts, is provided with a latch structure 325a for releasably retaining the lever 317 in selected position and thus effect continued operation of the machine until the latch is released.

This latch structure 325a includes a socket 326 (Fig. 12) in the lever 317 within which either one of two pins 327 and 328 is adapted to seat, depending upon in which direction the handle 316 and lever 317 are swung from the intermediate, or "neutral" positions thereof in which they are illustrated. The arrangement and operation of the pins 327 and 328 can best be understood by reference to Figs. 12 and 18, which show both pins 327, 328 to be slidably mounted in the horizontal frame member 23. Each of the pins 327 and 328 is provided with a spring 329 urging the pin to project beyond that side of the frame member 23 with which the lever 317 and bell crank 313 are associated. When the selector mechanism 325 is in its neutral position, such motion of the pin 327 is prevented by the leg 318 of the bell crank 313 which overlies the end of the hole in the frame member 23 in which the pin 327 is disposed, as indicated in Fig. 12. However, when the control rod 314 is operated to turn the arm 317 counter-clockwise (Fig. 12), the bell crank 313 is similarly rotated, displacing the leg 318 and bringing the socket 326 of the arm 317 into alignment with the pin 327 so that the spring 329 can push the pin 327 into the socket 326 to retain the cam plate 307 in latch dog retracting position.

Rotation of the control rod 314 and lever 317 clockwise (Fig. 12) effects corresponding rotation of another bell crank 331 so mounted on the control rod 314 that one leg 332 thereof lies along the opposite side of the arm 317 from the leg 318 of the bell crank 313. A coil spring 333 under tension between the other leg 334 of the bell crank 331 and a suitable anchor 336 continually resists such clockwise rotation of the bell crank 331 as viewed on Fig. 12 and hence presses the leg 332 toward the arm 317. The leg 332 of the bell crank 331 overlies the outer end of the pin 328 so that the leg 332 functions in connection with its pin 328 in the same manner that the leg 318 of the bell crank 313 operates in connection with the pin 327. The function of the bell crank 331 is to control mechanism for rotating the tire 20 continuously, as will be explained later herein.

Manually operable apparatus is included for withdrawing either pin 327 or pin 328 from latching engagement with the arm 317 and thus permitting the arm 317 to return to its neutral position regardless of in which direction the control rod 314 and the arm 317 may have been rotated from that position. A block 341 (Fig. 18) is rigidly affixed to the inner surface of the frame member 23 by bolts 342 and provides pivotal support for upper and lower levers 343 and 344, respectively, which are mounted on the block 341 by a vertical pivot pin 345. The upper lever 343 is provided with a hole 346 through which the upper latching pin 328 extends, and beyond which the lever 343 continues to overlie a hole 347 in the frame member 23 within which the inner end of a quick-release control rod 348 is seated. The rod 348 is normally held retracted from the lever 343 by a spring 349 under compression between the frame member 23 and a collar 350 anchored on the rod 348 by a pin 351 (Figs. 2 and 12). Retraction of the rod 348 is limited by a second pin 351a (Fig. 2). The rod 348 extends through a wall of the casing 25 so that the rod 348 is conveniently accessible to an operator in such position that in emergency the rod 348 may quickly be pushed inward. Such motion of the rod 348 swings the lever 343 to the right, as viewed in Fig. 18, causing it to engage a washer 352 anchored in position on the latch pin 328 by a cotter pin 353. If this is done at a time when the leg 332 of the bell crank 331 is displaced by the arm 317 and the pin 328 is seated in the socket 326 of the arm 317, the described swinging of the lever 348 will effect retraction of the pin 328 from the socket 326 of the arm 317 and permit the latter to return to its neutral position.

The lower lever 344 is provided with a hole 356 through which the pin 327 extends, and movement of the lever 344 to the right as viewed in Fig. 18 effects retraction of the pin 327 by engagement of the lever 344 with a washer 357 held in place on the pin 327 by the cotter pin 358. Consequently, when the lever 344 is thus moved, the arm 317 of the selector mechanism 325 is permitted to return to its neutral position from the position in which it displaces the bell crank 313. A block 361 is welded to the lower lever 344 and extends upward therefrom to a position alongside the upper lever 343. Hence whenever the lever 343 is moved by the quick-release rod 348 the lower lever 344 is similarly moved, but movement of the lower lever 344 does not effect movement of the upper lever 343 since the block 361 is not attached to the upper lever 343.

A roller 362 is rotatably mounted on a pin (not shown) extending downward from the block 361, and a similar roller 363, spaced laterally from the roller 362, is rotatably mounted on a pin (not shown) extending upward from a plate 364 rigidly attached to the frame member 23 by bolts 366. A longitudinally extensible wedge bolt 367 is slidable on the upper surface of the plate 364 and is restrained from lateral movement by guide pins 368 and 369. The wedge bolt 367 is connected at one end by a pivot pin 371 to the outer end of a lever 372 whereby the wedge bolt 367 may be moved forward to thrust its other end, which is suitably chamfered for the purpose, between the two rollers 362 and 363. Since the roller 363 is carried by a stationary pin such operation of the wedge bolt 367 forces the roller 362 to the right as viewed in Fig. 18, carrying with it the lower lever 344 to retract the latch pin 327 in the manner hereinabove described. A coil spring 373 under compression between the frame member 23 and the extended after end of the lower lever 344 normally retains the lever 344 in that position which permits the latch pin 327 to seat within the socket 326 of the arm 317.

The lever 372 is rigidly mounted on the upper end of a vertical shaft 376 which extends downward in front of the front wall 24 of the casing 25 where it is journalled in aligned bearings 377 and 378 (Fig. 12) carried by the crossbar 41 and the housing 25, respectively. The vertical shaft 376 is provided with a radially extending plate 379 the outer edge of which lies in the path of a finger 380 rigid with one of the tire-mounting arms 32. The association between the finger 380 and the plate 379 is such that rotation of the arms 32 after the finger 380 has engaged the plate 379 will cause the shaft 376 to be rotated clockwise, as viewed in Fig. 18, turning the crank 372 to thrust the wedge bolt 367 between the rollers 362 and 363 as hereinabove described. A coil spring 381 under tension between the pin 369 and a pin 382 on an extension of the lever 372 normally retains the wedge bolt 367 retracted and the plate 379 in position for engagement by the finger 380.

The bell crank 331 to which reference has been made hereinabove, constitutes a portion of a mechanism for attaining constant rotation of the tire so as to permit circumferential grooving of the tread thereof, and is operated only when the carriage reciprocating mechanism and the intermittent drive are idle. As indicated in Fig. 12, the leg 334 of the bell crank 331 carries a pin 391 which extends into a circumferential groove 392 of a collar 393 slidable on the shaft 270 on which the tire-advancing roller 272 is carried. The collar 393 is connected to the shaft 270 for rotation therewith by a suitable spline structure (not shown). When the bell crank 331 is rotated clockwise as viewed in Fig. 12, its pin 391 moves the collar 393 to the left and into rotationally interlocked engagement with a second collar 394 which is mounted for free rotation on the shaft 270. The collars 393 and 394 constitute the movable and fixed portions, respectively, of a clutch 396 which, when engaged, connects a sprocket 397 to the shaft 270 to effect rotation of the latter by the former. A chain 398 is trained around the sprocket 397, and likewise around a driving sprocket 399 rigid with the crank shaft 214 adjacent the cam 288. Thus it is apparent that the tire-advancing roller 272 will be rotated continuously so long as the clutch 396 is engaged, since the shaft 214 rotates continuously, regardless of whether the carriage 56 reciprocates or remains idle.

Means are provided for preventing operation of the intermittent feed when the clutch 396 is engaged as well as when the automatic stop plate 379 is actuated. A bracket 411 (Figs. 12, 14, 15 and 16) is mounted for pivotal movement on a suitable pin 412 extending from the frame member 205, in such position that when standing erect the bracket 411 will engage the lever 282 and hold the same in its uppermost position and thereby prevent the oscillatory movement of the lever 282 upon which operation of the intermittent feeding mechanism is dependent.

The hub 413 of the bracket 411 carries a leaf spring 414 extending upward therefrom into the path of an abutment screw 416 adjustably mounted on a downward extension 417 of the latch dog 304. The parts are so arranged that when the crank 302 which carries the latch dog 304, is turned to the limit of its counter-clockwise movement, as viewed in Fig. 14 (i. e., when the carriage 56 is in its fully retracted position), and when the latch dog 304 is unseated from the notch 307, the abutment screw 416 bears against the spring 414 with sufficient pressure to move the bracket 411 to erect position, in opposition to the action of a tension spring 418 which constantly urges the bracket 411 to rotate out from under the intermittent feed actuating lever 282. Therefore, if the camming plate 308 is turned to dog-unseating position, as illustrated in Fig. 12, during operation of the reciprocating mechanism, the next successive counter-clockwise movement (Fig. 12) of the crank 206 will not only effect retraction of the dog 304 from the notch 307 and immobilization of the carriage in retracted position, but will also dispose the abutment screw 416 in position to engage and deflect the spring 414. This will overcome the force of the spring 418 and urge the bracket 411 toward its erect position.

The inherent flexibility of the leaf spring 414 avoids the necessity of precisely synchronizing the oscillatory movement of the abutment screw 416 with the cam 288. When the screw 416 engages the spring 414, the bracket 411 is merely pressed against the side of the rising lever 282 unless, of course, the lever 282 is already high enough to clear the bracket 411. Upon arrival of the lever 282 at its uppermost position, the bracket 411 snaps under the lever, preventing further operation of the intermittent feed, in spite of the fact that the cam 288 continues to rotate.

When the dog 304 is again seated within the notch 307 to resume carriage reciprocation, the abutment screw 416 is withdrawn from spring-flexing position. Pressure against the leaf spring 414 being thus relieved, the spring 418 functions to draw the bracket 411 from under the lever 282, permitting the roller 289 to move in accordance with the configuration of the cam 288. Since this cam is double-lobed, the lever 282 is thus lowered and raised twice during each cycle of the carriage 56, once while the carriage 56 is at or adjacent its fully advanced position, and again while the carriage 56 is at or adjacent its fully retracted position.

A second and similarly operating adjustable abutment screw 421 (Figs. 14 and 16) is associated with the leaf spring 414, the screw 421 being carried by an arm 422 rigid with a rod 423 rotatably supported from the upright frame member 205 and extending through a wall of the cabinet 25. A tension spring 424 normally retains the lever 422 in the position indicated in broken lines in Fig. 14, but a handle 425 on the rod 423 (Fig. 1) outside the casing 25 permits manually turning the rod 423 to swing the lever 422 to the full line position, wherein the abutment screw 421 bears against the leaf spring 411 when it is desired to stop reciprocation of the carriage 56 without waiting for the automatic stopping mechanism to function.

A stop pin 426 rigid with the frame member 205 and lying in the path of a finger 428 projecting from the lever 422 limits the distance through which the lever 422 can be turned toward the spring 414. A latch member 429 pivotally supported on the frame member 205 by a suitable pin 430 is pulled by a spring 431 into engagement with a shoulder 432 on an extension 433 of the lever 422, to retain the lever 422 and the abutment screw 421 in spring-deflecting position and thus hold the intermittent feed mechanism inoperative until the latch dog 304 carries the crank 302 to its upper limit of movement, i. e., until the carriage 56 reaches its outermost position. At that time, an adjustable abutment screw 434 carried by a bracket 435 on the crank 302 engages a finger 436 projecting from the latch 429, lifting the same to permit the spring 424 to return the lever 422 and the abutment screw 421 to retracted position and thus permit movement of the intermittent feed lever 282 by the cam 288.

A nozzle 450 (Fig. 10) is mounted on the frame 81 by a clamp 451, in position to direct a jet from the nozzle onto the cutters 96 and thereby prevent their becoming overheated while performing their cutting operation. A supply conduit 452 connects the nozzle 450 to any suitable supply of water under pressure. A catch basin 454 (Figs. 1, 3, 4, and 5) in the base 455 of the machine, collects the water after it has been applied to the cutters 96; and a pump 456 (Figs. 4 and 5) driven from the motor 215 by a belt 457, may be employed to dispose of water from the catch basin in the event that the machine is installed in a location lacking suitable drainage.

There is also provided an attachment 461, best shown in Figs. 2 and 4, for grooving the tread of a tire circumferentially and intended for use when the tire is being rotated continuously as the result of engagement of the clutch 396. The attachment 461 comprises a body portion 462 slidably and preferably removably mounted on a horizontal track 463 rigidly attached to the frame member 23 by brackets 464 extending laterally therefrom. The body portion 462 is adapted to be anchored in selected position of adjustment along the track 463 by a clamping screw 466. The body portion 462 carries a tool holder 467 (Fig. 4) mounted in an inclined position in the body portion 462 in such a manner that it can be advanced toward a tire mounted on the spindle 21 and retracted therefrom, by a feed screw 468. A tread cutting tool 469 is mounted on the tool holder 467 in position to engage and cut a tire tread when the tool 469 is advanced into suitable operative relation to a tire being rotated on the spindle 21.

*Operation*

A tire whose tread is to be cut is mounted on the spindle 21, inflated, and then raised by manipulation of the hand wheel 46, until it engages the feed roller 272. The hand wheel should then be turned approximately another full turn in the same direction, to ensure firm pressure of the roller 272 against the tread 22. The nut 118 should be adjusted to move the pointer 121 into position indicating the desired depth to which the tread 22 is to be crosscut and the screw 132 should be adjusted to position its pointer 138 in alignment with the calibration 140 corresponding to the section size of the tire. If the tread is to be cut uninterruptedly across its entire width, the "skip-cutting" head 179 should be removed from the machine. The tire should be rotated by hand clockwise as viewed in Fig. 1 until the automatic stop-finger 380 (Fig. 12) touches the back of the plate 379, to place the tire so that after the machine is started the tire will experience approximately a full turn before actuating the automatic stopping mechanism.

A switch 440 accessible on the casing 25 should then be closed, and since this switch 440 is connected to the motors 215 and 220 by suitable electrical conductors 441 and 442, respectively, (Fig. 4) both motors will be placed in operation. The cutter head 89 will then be rotated by the motor 220, and the crankshaft 214 will be rotated by the motor 215, causing the crank arm 206 to oscillate about the axis of the rock shaft 203, but without having any effect on the rock shaft 203, assuming its clutch 207 to be disengaged when the switch 440 is closed.

The handle 316 for the selector mechanism 325 should then swing to the left (Fig. 1), which will turn the bell crank 313 counterclockwise (Fig. 12) and thus effect retraction of the camming plate 308 to a position permitting seating of the dog 304 within the notch 307 of the crank arm 206 the next successive time that the crank arm approaches the lower limit of its oscillatory movement. This will effect engagement of the rock shaft clutch 207, causing the rock shaft 203 to oscillate with the crank arm 206, and thereby effect reciprocation of the carriage 56. The control handle 316, bell crank 313, and camming plate 308 will be retained in their positions effecting engagement of the clutch 207 by the pin 327 which seats within the socket 326 upon arrival of the arm 317 in that position wherein the bell crank 313 is turned far enough to ensure clutch engagement.

Reciprocation of the carriage 56 will cause the cutter blades 96 to transversely slit the tread 22 of the tire 20. Due to the thin nature of each of the cutter blades 96 and to the fact that the blades are rotated at high speed and continuously cooled and lubricated by water jetted onto the blades by the nozzle 450, each cutter blade 99 will cut cleanly and without removing any of the tread material. Another factor contributing to this same end is the staggered relation of the cutting teeth 100 of adjacent cutters, which permits accommodation of the tread material displaced by a tooth 100 within the spaces between teeth of the two cutters at each side thereof. Hence, the slits thus formed will be closed after passage of the cutter blades, and the tire tread after being slitted will have maximum anti-skid characteristics and its durability will not be jeopardized.

When the latch dog 304 seats within the notch 307 in accordance with the description hereinabove, the extension 417 is rotated clockwise (Fig. 14), withdrawing the abutment screw 416 to a position wherein it no longer flexes the spring 414 sufficiently to overcome the urgency of the spring 418. This effects withdrawal of the bracket 411 from under the lever 282 and starts operation of the intermittent feed mechanism (assuming the quick release handle 423 to be upright, in which case the arm 422 and the abutment screw 421 will be retracted to the broken line position thereof illustrated in Fig. 14). The tire 20 will be automatically rotated through a small angular distance after each passage of the cutter blades 96 across the tread in either direction, since the cam 288 presents two lobes to the roller 289 during each full turn of the shaft 214.

In the event that it is desirable to stop the machine before completion of the cross cutting operation throughout the entire circumference of the tire, as, for example, to check the depth to which the tread is being cut, the operator should push the quick release handle 348 (Fig. 1). This will actuate both release levers 343 and 344 (Fig. 18), and movement of the latter will effect withdrawal of the latch pin 327 from engagement with the arm 317 of the selector mechanism 325 and permit return of the cam plate 308 (Fig. 14) to that position wherein the latch dog 304 will ride thereon when the dog next approaches its lowermost position. The cam plate 308 will therefore withdraw the latch dog 304 from the notch 307 and thereby disengage the clutch 207 to permit the carriage 56 to come to rest as the carriage 56 approaches its fully retracted position.

This assures that the carriage 56 will come to rest in a retracted position wherein the cutters 96 are withdrawn from the tire 20, at the end of a crosscutting operation.

Withdrawal of the latch dog 304 from the notch 307 likewise returns the extension 417 and the abutment screw 416 to their starting positions, flexing the spring 414 and thereby causing the bracket to move under the intermittent feed lever 282 the next time the lever reaches the top of its stroke. Operation of the intermittent feed mechanism will thereby be interrupted, although the cam 288 continues to rotate. The machine can be made to resume operation by again moving the control handle 316 to the left, whereupon both reciprocation of the carriage and actuation of the intermittent feed will be recommenced.

By permitting the machine to continue operation until it stops automatically, the tire will be turned in step-by-step motion until it has made substantially one full turn from its starting position, and its tread 22 is crosscut throughout substantially its entire circumference. The pin 380 will then engage and turn the automatic stop plate 379 (Fig. 12) turning the shaft 376, and causing the wedge bolt 367 (Fig. 18) to displace the lever 344 to retract the latch pin 327 from the arm 317 of the selector mechanism. This will permit the cam plate 308 to return to its starting position and cause cessation of both carriage reciprocation and tire advance, as already described.

The relationship between the cam 288 and crank 213 is such that the tire is advanced just after the cutter blades 96 complete their traversal of the tread 22 and before completion of the stroke of the carriage 56. Therefore, when the carriage 56 comes to rest at or adjacent its inner extreme of movement, in accordance with the hereinabove description, the tire will have been advanced to remove the tread area just slitted from alignment with the cutters. Because of this, if after the machine has stopped automatically, there remains uncut an area of the tread wider than the spacing between the two outermost cutter blades 96 on the cutter head 89, but less than twice such width, the carriage 56 should be reciprocated again without permitting the feed mechanism to operate. This is accomplished by first rotating the indexing handle 425 to the left (Fig. 1), causing the arm 422 and the abutment screw 421 to move to the full line position thereof (Fig. 14), flexing the spring 414 and thereby causing the bracket 411 to move under the intermittent feed lever 282 the next time the lever reaches the top of its stroke. The feed mechanism will thereby be prevented from operating. The operator should also return the control handle 316 (Fig. 1) to its position at the limit of its possible movement to the left (Fig. 1), holding it there momentarily since the latch pin 327 will still be held in retracted position by the wedge bolt 367. This manipulation of the handle 316 will effect engagement of the rock shaft clutch 207, and consequent actuation of the carriage 56, without effecting any advancing movement of the tire, and the cutter blades will be propelled across the tire, cutting a single series of slits thereacross, and then return to retracted position with the cutters passing again through the slits just formed, i. e., without cutting another series of slits.

On the other hand, should the automatic stopping mechanism bring the machine to rest while there remains uncut a section of tread more than twice as wide as the spacing between the outermost cutter blades 96, the operator should operate the handle 316 momentarily in the same manner as before described but without operating the indexing handle 425. This will cause the carriage 56 to undergo one more complete reciprocation, cutting two additional series of slits, and thereafter again advancing the tire to displace the last formed series of slits from alignment with the cutters 96. The machine will then automatically come to a stop, as the wedge bolt 367 still holds the latch pin 327 retracted. This operation may be repeated as often as necessary and until the tread is completely crosscut, with or without operating the indexing handle to prevent tire advancement, as circumstances may require.

If it is desired to crosscut and leave any portion of the tread width uncut, as, for example, the three intermediate beads 470 of the tread (Fig. 6), before the machine is started the "hop out" cam 176 should be mounted in position directly overlying these beads 470. This is accomplished by sliding the head 179 onto the plate 180 (Fig. 11) and locking the head 179 with the cam 176 in the desired position transversely of the tire, by the locking screw 182. The cam 176 should then be lowered into close adjacency with the tire by the appropriate manipulation of the elevator screw 184. When the carriage is reciprocated with the cam 176 thus positioned, the frame 81 will be lifted and the cutter blades 96 withdrawn from the tread as the blades approach the intermediate beads from either side. Thus the intermediate beads 470 will remain uncut, while the beads 471 on both sides of the intermediate beads will be cut in the same manner as were the slitting continuous clear across the tread.

The machine of the invention may be employed to "regroove" a tire, i. e., to initially form grooves or to deepen existing grooves which extend circumferentially of the tread, as indicated at 473 in Fig. 6. When such an operation is to be performed, the tire is mounted on the spindle 21 as before, and the grooving head (Figs. 2, 3, and 4) mounted on the track 463. The head 462 should be slid along the track 463 until the cutting tool 469 overlies the portion of the tread's width where the grooving is to be performed, and the clamping screw 466 should then be tightened. Then the tool 469 may be advanced into cutting relation with the tread by suitable manipulation of the feed screw 468. The control handle 316 should then be turned, but this time to the right (Fig. 1), engaging the continuous drive clutch 396 as hereinabove described, and causing the drive roller 272 to be rotated continuously. This will cause the tire to turn slowly but without interruption, and without effecting reciprocation of the carriage or operation of the intermittent feed mechanism, since turning the handle 316 clockwise turns only the bell crank 331 (Fig. 12) and has no effect on the bell crank 313.

The continuous drive clutch 396 will remain in engaged condition without requiring that the handle 316 be held, because the latch pin 328 seats within the socket 326 of the arm 317 when the bell crank 331 has been turned far enough to attain clutch engagement. The machine may be stopped, however, at any desired time, by pushing the quick release rod 348, which will actuate the upper release lever 343 to effect withdrawal of the latch pin 328, thus releasing the arm 317 and permitting disengagement of the clutch 396.

If more than one groove 473 is to be formed or deepened, the described operation of the regroover can be repeated as many times as required, with the head 462 repositioned on the track to dispose the cutting tool appropriately for each such additional groove.

While we have shown the described preferred apparatus for carrying out our invention, it will be understood that it is capable of modification and variation while still employing the principles of the invention. It is to be understood, therefore, that the scope of the invention should be limited only by the scope and proper interpretation of the claims appended hereto.

Having thus described our invention, what we claim and desire to protect by Letters Patent is:

1. A machine for transversely cutting a tire tread comprising a tire support, a carriage mounted for reciprocation in a path extending angularly with respect to the plane of a tire mounted on the support, means for reciprocating the carriage, a tread cutting tool supported from the carriage for reciprocation therewith and for movement toward and away from the tire, a rotatable guide roller supported from said carriage in position to make rolling contact with the tire and operably connected to the tool to limit the depth to which the cutting tool cuts the tread, and means mounted on the tire support and supported thereby in operative position independently of the tire for withdrawing the tool from cutting engagement with the tire while the tool traverses a predetermined portion of the tread.

2. A machine for cutting a tire tread, comprising means for supporting a tire to be cut, a tread cutting tool, means for moving the tool relatively to a tire mounted on said supporting means, means engageable with the tire to hold the tool in predetermined cutting relation to the tread of the tire during relative movement therebetween, and means mounted on the tire support and retained thereby in operative position independently of the tire for temporarily withdrawing the cutting tool from the tire during relative motion therebetween.

3. A machine for cutting a tire tread, comprising means for supporting a tire to be cut, a tread cutting tool, means for moving the tool relatively to a tire mounted on said supporting means, means engageable with the tire to hold the tool in position to cut the tread of the tire to a predetermined depth during relative movement between the tire and tool, and means mounted on the tire support and supported thereby in operative position independently of the tire and operative as the tool approaches a predetermined portion of said tread for temporarily withdrawing the cutting tool from the tire during relative motion therebetween.

4. A machine for crosscutting a tire tread comprising tire mounting means, a tread cutting tool, means for moving said tool transversely of a tire on said mounting means, means for advancing the tool into cutting relation with the tread of said tire, means operable in response to engagement with the tire for limiting operation of the tool advancing means, and means operable independently of said limiting means for temporarily withdrawing the tool from said tread during operation of said tool moving means.

5. A tire tread slitting machine comprising a tire support, a guide track extending transversely of a tire mounted on said support, a carriage movably mounted on said guide track, a frame mounted on said carriage for movement toward and away from said tire, a tread cutting tool supported from said frame, means urging the frame toward said tire to dispose the cutting tool in position to cut the tread of the tire upon reciprocation of the carriage, means carried by the frame in position to engage the tire to limit the depth to which the cutting tool cuts the tire, means for reciprocating the carriage, and means supported in operative position independently of the tire and operative when said cutting tool approaches a predetermined portion of the tread for temporarily retracting the frame to withdraw the cutting tool from engagement with the tire.

6. A tire tread slitting machine comprising a tire support, a guide track extending transversely of a tire mounted on said support, a carriage movably mounted on said guide track, a frame mounted on said carriage for movement toward and away from said tire, a tread cutting tool supported from said frame, yieldable means urging the frame toward said tire to dispose the cutting tool in position to cut the tread of the tire upon reciprocation of the carriage, means for reciprocating the carriage, a cam follower carried by said frame, and a stationary cam in the path of said follower and supported independently of the tire in position to retract said frame against the force of said yieldable means as said cutting tool traverses a predetermined portion of said tread.

7. A tire tread slitting machine comprising a tire support, a guide track extending transversely of a tire mounted on said support, a carriage movably mounted on said guide track, a frame mounted on said carriage for movement toward and away from said tire, a tread cutting tool supported from said frame, yieldable means urging the frame toward said tire to dispose the cutting tool in position to cut the tread of the tire upon reciprocation of the carriage, means for reciprocating the carriage, a cam follower carried by the frame, and a stationary cam mounted independently of the tire in the path of said follower in position to retract said frame when said cutting tool has completed traversal of the shoulder portion of the tread and to hold the frame in retracted position until the tool has completed traversal of a predetermined extent of the central portion of the tread.

8. A machine for cutting a tire, comprising mounting means for supporting a tire to be cut, a carriage mounted for reciprocatory movement with respect to a tire on said mounting means, a frame, a cutting tool mounted on the frame, means mounting the frame on the carriage for movement of the cutting tool toward and away from the tire, a cutting depth gauge roller, adjustable means rotatably mounting said roller on said frame in position to engage said tire in close adjacency to said cutting tool, means for adjusting said roller mounting means toward and away from the tire and with relation to the frame to regulate the depth to which said cutting tool cuts the tire upon reciprocation of said carriage, means for reciprocating the carriage, and means supported by said tire supporting means independently of the tire in position to disable the cutting tool throughout a predetermined part of the reciprocating stroke of the carriage.

9. A machine for cutting a tire, comprising mounting means for supporting a tire to be cut, a carriage mounted for reciprocatory movement with respect to a tire on said mounting means, a frame, a cutting tool mounted on the frame, means mounting the frame on the carriage for movement of the cutting tool toward and away from the tire, a cutting depth gauge roller, adjustable means rotatably mounting said roller on said frame in position to engage said tire in close adjacency, means for adjusting said roller mounting means toward and away from the tire and with relation to the frame to regulate the depth to which said cutting tool cuts the tire upon reciprocation of said carriage, means for reciprocating the carriage, a cam follower mounted on said frame, a cam, and means mounting the cam in predetermined fixed position with relation to said tire and independently of the same in the path of said cam follower to retract the frame and thereby withdraw the cutting tool from cutting relation with the tire while the tool traverses a predetermined part of the tire.

10. A tire tread cutting machine comprising a tire holder, a carriage reciprocable with respect thereto, a tire tread cutting tool carried by said carriage and mounted thereon for movement toward and away from a tire on said holder, means for reciprocating the carriage, gauging means reciprocable with said carriage while in engagement with the tread of the tire and operably connected to said tool to limit the depth to which the tool penetrates the tread of the tire, supplemental means operable as said gauging means traverses either lateral shoulder of the tread to limit penetration of the portion of the tread adjacent the shoulder by the tool, and means operable in response to movement of the carriage in one direction for disabling said supplemental means and operable in response to movement of the carriage in the opposite direction for reinstating said supplemental means.

11. A tire tread cutting machine comprising a tire support, a carriage mounted for reciprocation with respect thereto, a frame mounted on the carriage for movement toward and away from the tire support, a cutting tool carried by the frame in position to cut the tread of a tire on said support, cutting depth gauging means carried by said frame in position to engage the tread and thereby limit approach of said frame toward the tire support and penetration of the tread by said cutting tool while the gauging means engages the central portion of the tread, means carried by said frame for limiting approach of said frame to the tire as the gauging means traverses one part of the tread, and means operable as the gauging means traverses another part of the tread for disabling said limiting means.

12. A tire tread cutting machine comprising a tire support, a carriage mounted for reciprocation with respect thereto, a frame mounted on the carriage for movement toward and away from the tire support, a cutting tool carried by the frame in position to cut the tread of a tire on said support, cutting depth gauging means carried by said frame in position to engage the tread and thereby limit approach of said frame toward the tire support and penetration of the tread by said cutting tool while the gauging means engages the central portion of the tread, abutment means rigid with the carriage, a stop screw carried by said frame in position to engage said abutment means and thereby limit approach of said frame to the tire as the gauging means traverses one of the lateral shoulders of the tread, a shim movably mounted in overlying relation to said abutment means, and means operable as the gauging means approaches said lateral shoulder of the tread for interposing the shim between said stop screw and the abutment means and for withdrawing the shim as the gauging means approaches the opposite lateral shoulder of the tread.

References Cited in the file of this patent

UNITED STATES PATENTS

| | | |
|---|---|---|
| 2,048,947 | Piquerez | July 28, 1936 |
| 2,105,316 | Fleming | Jan. 11, 1938 |
| 2,158,167 | Wikle | May 16, 1939 |
| 2,167,017 | Wikle | July 25, 1939 |
| 2,183,376 | Wikle | Dec. 12, 1939 |
| 2,465,058 | Burkett | Mar. 22, 1949 |
| 2,531,841 | Cashin | Nov. 28, 1950 |
| 2,660,128 | Hayes | Nov. 24, 1953 |
| 2,737,237 | Herzegh | Mar. 6, 1956 |